United States Patent
Cornett et al.

(10) Patent No.: US 10,116,413 B2
(45) Date of Patent: *Oct. 30, 2018

(54) DETERMINING A HIGH DATA RATE FOR BACKCHANNEL COMMUNICATIONS FOR INITIALIZATION OF HIGH-SPEED NETWORKS

(71) Applicant: Intel Corporation, Santa Clara, CA (US)

(72) Inventors: Frank N. Cornett, Cadott, WI (US); Brent R. Rothermel, Pottstown, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,478

(22) Filed: Aug. 22, 2017

(65) Prior Publication Data

US 2017/0353266 A1    Dec. 7, 2017

Related U.S. Application Data

(63) Continuation of application No. 15/363,861, filed on Nov. 29, 2016, now Pat. No. 9,742,523, which is a
(Continued)

(51) Int. Cl.
*H04L 1/00*    (2006.01)
*H04L 7/00*    (2006.01)
(Continued)

(52) U.S. Cl.
CPC .......... *H04L 1/0002* (2013.01); *H04L 1/0015* (2013.01); *H04L 1/0034* (2013.01);
(Continued)

(58) Field of Classification Search
None
See application file for complete search history.

(56) References Cited

U.S. PATENT DOCUMENTS 6,847,679 B1 * 1/2005 Kim .................... H04L 27/2608
375/222
8,599,913 B1    12/2013 Brown
(Continued)

FOREIGN PATENT DOCUMENTS

| CN | 101960804 A | 1/2011 |
|---|---|---|
| EP | 1770912 A1 | 4/2007 |
| WO | 2009-111137 A2 | 9/2009 |

OTHER PUBLICATIONS

Corrected NOA issued in U.S. Appl. No. 14/142,139, dated Oct. 13, 2016, 2 pages.
(Continued)

*Primary Examiner* — Vinncelas Louis
(74) *Attorney, Agent, or Firm* — Grossman, Tucker, Perreault & Pfleger, PLLC

(57) ABSTRACT

One embodiment provides a network controller having physical interface (PHY) circuitry that includes transmitter circuitry configured to transmit data frames to a link partner over a channel link. The network controller also includes a link speed cycling module configured to cause the transmitter circuitry to transmit data frames to the link partner using at least one high rate link speed. The network controller also includes an equalization presets module configured to apply at least one equalization preset setting to the transmitter circuitry while the transmitter circuitry is transmitting the data frames to the link partner. The link speed module is further configured to cause the transmitter circuitry to dwell, for a transmitter dwell time period, for the at least one equalization preset setting at the at least one high rate link
(Continued)

speed. The transmitter dwell time period allows the link partner to lock on to the transmitted data frames.

15 Claims, 15 Drawing Sheets

Related U.S. Application Data continuation of application No. 14/142,139, filed on Dec. 27, 2013, now Pat. No. 9,509,438.

(51) Int. Cl.
| | | |
|---|---|---|
| *H04L 25/03* | (2006.01) | |
| *H04L 27/01* | (2006.01) | |
| *H04L 25/49* | (2006.01) | |
| *H04N 7/173* | (2011.01) | |
| *H04L 12/24* | (2006.01) | |
| *H04L 27/26* | (2006.01) | |

(52) U.S. Cl.
CPC ...... *H04L 7/0087* (2013.01); *H04L 25/03343* (2013.01); *H04L 25/03987* (2013.01); *H04L 25/4906* (2013.01); *H04L 27/01* (2013.01); *H04L 27/2608* (2013.01); *H04L 41/0806* (2013.01); *H04N 7/17309* (2013.01); *Y02D 50/10* (2018.01)

(56) References Cited

U.S. PATENT DOCUMENTS

| | | |
|---|---|---|
| 2004/0243666 A1 | 12/2004 | Wood |
| 2007/0127920 A1* | 6/2007 | Ghiasi ............ H04L 69/24 398/25 |
| 2009/0154491 A1 | 6/2009 | Diab |
| 2009/0245120 A1 | 10/2009 | Jones |
| 2013/0145212 A1 | 6/2013 | Hsu |
| 2015/0131708 A1 | 5/2015 | Cornett et al. |
| 2015/0304142 A1 | 10/2015 | Cornett et al. |

OTHER PUBLICATIONS

NOA issued in U.S. Appl. No. 14/142,139, dated Jul. 20, 2016, 20 pages.
Non-final Office Action issued in U.S. Appl. No. 14/142,139, dated Dec. 15, 2015, 17 pages.
Non-Final Office Action for U.S. Appl. No. 14/075,346 (U.S. Publication No. 20150131708), dated Nov. 1, 2014, 18 pages.
Notice of Allowance for U.S. Appl. No. 14/075,346 (U.S. Publication No. 20150131708), dated Apr. 1, 2015, 26 pages.
Non-Final Office Action for U.S. Appl. No. 14/753,981 (U.S. Publication No. 2015/0304142), dated Aug. 31, 2015, 27 pages.
Final Office Action for U.S. Appl. No. 14/753,981 (U.S. Publication No. 2015/0304142), dated Feb. 11, 2016, 15 pages.
Notice of Allowance for U.S. Appl. No. 14/753,981 (U.S. Publication No. 2015/0304142), dated May 16, 2016, 27 pages.
International Preliminary Report on Patentability and Written Opinion issued in corresponding PCT Application No. PCT/US2014/067528, dated Jul. 7, 2016, 9 pages.
International Search Report and Written Opinion issued in PCT Application No. PCT/US2014/067528, dated Feb. 26, 2015, 10 pages.
Extended European Search Report issued in European Application No. 14875009.4, dated Jul. 24, 2017, 8 pages.
Khoury, John M. et al.: "High-Speed Serial Transceivers for Data Communication Systems", IEEE Communications Magazine, IEEE Service Center, Piscataway, US, vol. 39, No. 7, Jul. 1, 2001, pp. 160-165.
Notice of Allowance issued in U.S. Appl. No. 15/363,861, dated Apr. 18, 2017, 14 pages.
Chinese Office Action issued in Chinese Application No. 201480065634.3, dated Jun. 12, 2018, 23 pages.
European Examination Report issued in European Application No. 148750094, dated Jul. 11, 2018, 6 pages.

* cited by examiner

DETERMINING A HIGH DATA RATE FOR BACKCHANNEL COMMUNICATIONS FOR INITIALIZATION OF HIGH-SPEED NETWORKS

CROSS-REFERENCE TO RELATED APPLICATIONS

The present application is a continuation of U.S. patent application Ser. No. 15/363,861, filed Nov. 29, 2016, which is a continuation of U.S. patent application Ser. No. 14/142,139, filed on Dec. 7, 2013, now U.S. Pat. No. 9,509,438, the entire disclosures of which are incorporated herein by reference.

FIELD

The present disclosure relates to determining a high data rate for backchannel communications.

BACKGROUND

During the link initialization phase of the establishment of high-speed wired network communications, it is necessary for the two ends of the link to communicate in order to establish link rate, exchange link capabilities, and to adjust equalizer settings. This communication is commonly referred to as "backchannel" communication. For simplicity and cost savings, it is desirable that the backchannel be the same channel as is eventually utilized for data mode communications. When backchannel communication is initiated, the link rate may not have been established and link capabilities may not be known. Further, prior to adjusting equalizer settings, bit errors related to link characteristics (e.g., frequency response) may be prevalent. Equalizer adjustment is generally performed at a link operating rate (link rate). At the link rate, bit errors may degrade communication making reliable backchannel communication at the link rate difficult if not impossible prior to and/or during equalizer adjustment.

One solution is to provide a backchannel communications mode at a relatively lower bit rate and an equalizer adjustment mode at a higher bit rate, i.e., at the link rate. This solution requires mode shifting between the backchannel mode and the equalizer adjustment mode. Such mode shifting is undesirable as it adds time to the initialization process and requires synchronization between the two ends of the link. Such mode shifting also requires that the receiver equalizer be retrained (Infiniband method) after a mode shift, or that the receiver equalizer be frozen (Ethernet method) during backchannel communications. As link speeds increase, equalizer retraining or freezing assumes an increased level of risk with respect to repeatability and unexpected adaptation behavior.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to network systems (and methods) configured to provide continuous, and at least partially simultaneous, backchannel communications and equalizer setting communications between a node element and a link partner. In various embodiments, low rate data and commands (i.e., low rate bit stream) associated with backchannel communications may be encoded and modulated onto a high rate bit stream associated with equalizer setting communications, thus avoiding or reducing "mode shifting"

during backchannel communications. The method and system are configured to tolerate errors in the received high rate bit stream (e.g., prior to and/or during equalizer adjustment) while providing backchannel communication. As used herein, "high rate" corresponds to an operational (i.e., data mode) link rate and "low rate" corresponds to a backchannel communication rate.

At initialization, the link partners are typically unaware of each other's capabilities. Thus, this disclosure also relates to network systems (and methods) for determining a high data rate between link partners at initialization to enable, for example, backchannel communications to proceed at a high data rate. In various embodiments, a transmitter is configured to start transmitting at a selected high data rate speed and with a selected equalization setting. The transmitter is configured to cycle through a plurality of equalization settings and/or data rate (link speed) speeds. At least partially simultaneously, a linked receiver is configured to attempt to "lock" on to the data stream from the linked transmitter at a given link speed and/or equalization setting Once a lock is established, backchannel communication may proceed using the established link speed and equalization setting. In some embodiments, the link partners may be capable of communicating at several common link speeds and/or equalization settings. In such a case, the present disclosure also provides selection schemes to select a "best" link speed and/or equalization setting for communication. To enable a receiver to "lock" on to a given link speed and equalization setting, the present disclosure also provides overlap mechanisms to ensure that the receiver is given sufficient time at each cycle to make a determination of channel abilities.

The systems and methods are configured to accommodate polarity inversions resulting from cross-wiring of true and complement signals in a printed circuit board. As used herein, "true" means uncomplemented and "complemented", referring to a bit, means inverted. In some embodiments, the system and method are configured to detect mismatches in clock rates at the two ends of the link by, e.g., frame synchronization, as described herein.

Figure 1:
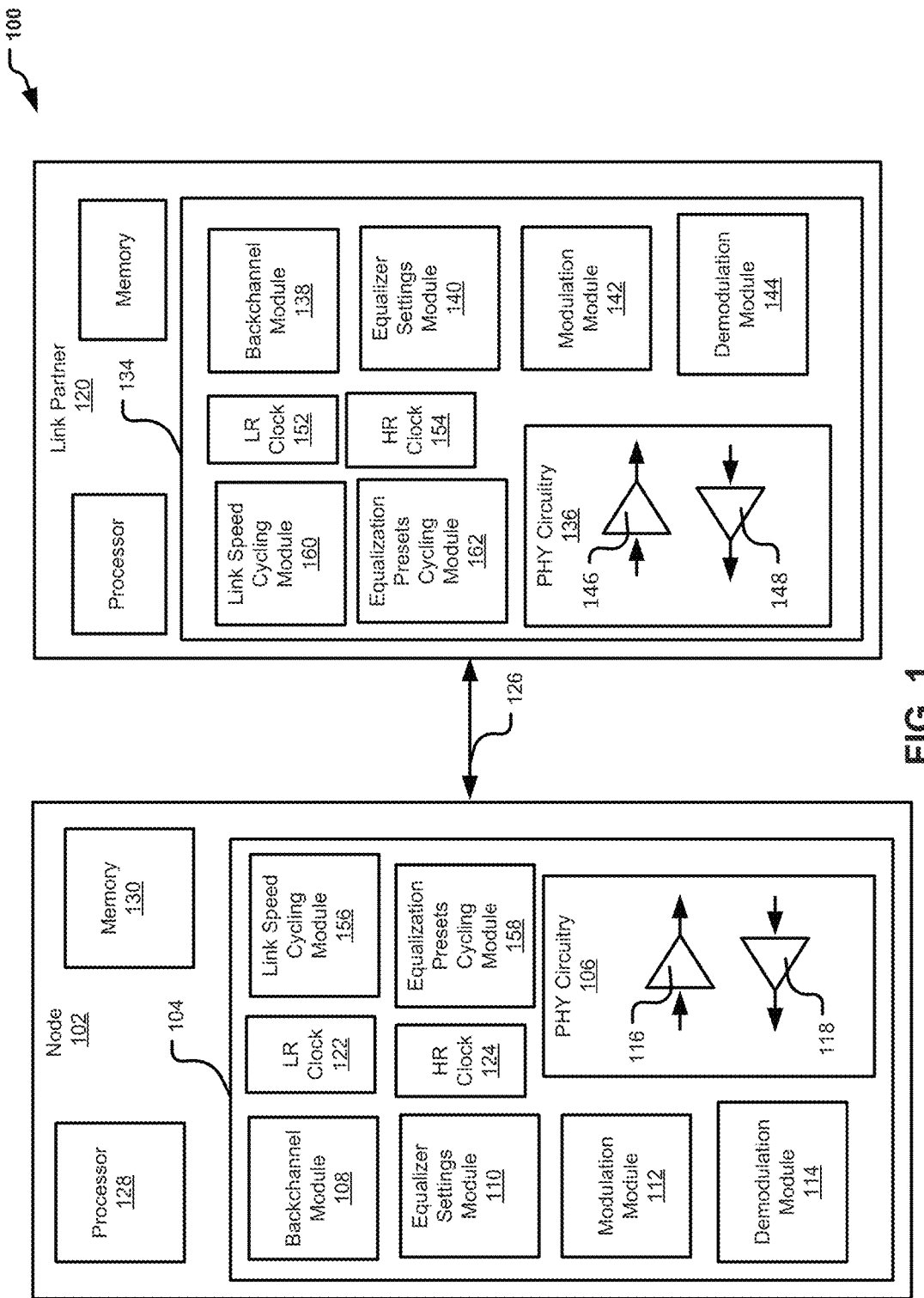
FIG. 1 illustrates a network system consistent with various embodiments of the present disclosure.

FIG. 1 illustrates a network system 100 consistent with various embodiments of the present disclosure. Network system 100 generally includes at least one network node element 102 and at least one link partner 120, each configured to communicate with one another via communications link 126. The network node element 102 and the link partner 120 may communicate with each other, via link 126, using a switched fabric communications protocol, for example, an Ethernet communications protocol, Infiniband communications protocol, etc. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. The Infiniband protocol may comply or be compatible with the Infiniband specification published by the InfiniB and Trade Association (IBTA), titled "Infini-Band™ Architecture Specification", Volume 1, Release 1.2.1, published June 2001 and/or later versions of this specification, for example, InfiniBand™ Architecture, Volume 1 (General Specification), Release 1.2.1, published January 2008 and Volume 2 (Physical Specification), Release 1.3, published November 2012. Of course, in other embodiments, the switched fabric communications protocol may include a custom and/or proprietary switched fabric communications protocol.

The link partner 120 and/or node element 102 may represent a computer node element (e.g., host server system), switch, router, hub, network storage device, chassis, server, data center, network attached device, non-volatile memory (NVM) storage device, cloud-based server and/or storage system, etc. The node 102 includes a network controller 104 (e.g., network interface card, etc.), a system processor 128 (e.g., multi-core general purpose processor, such as those provided by Intel Corp., etc.) and system memory 130. The link partner 120 is configured and operated in a similar manner as the node 102 and thus includes a network controller 134 similar to network controller 104.

Network controllers 104, 134 are generally configured to perform various operations during a link initialization phase when a link is first established between node 102 and the link partner 120 (e.g., upon system initialization, establishing a new link with the link partner, etc.). Such "backchannel" operations may include, for example, establishing link rate, exchanging link capabilities, adjusting equalizer settings and determining quality of equalization. Link capabilities may include, for example, PHY technology abilities, maximum link speed, next page, remote fault, Acknowledge, forward error correction (FEC) and/or FEC mode capabilities, Pause ability, etc., as may be defined by one or more of the aforementioned switched packet communication protocols. Adjusting equalizer settings is generally performed at operational link rates (i.e., operational link speeds). For example, operational link speeds may be relatively high speed, e.g., on the order of tens to hundreds of gigabits per second. Prior to and during early stages of adjusting equalizer settings, bit errors may be prevalent. Adjusting equalizer settings is configured to compensate for link characteristics (e.g., frequency response) that contribute to bit errors and, thus, to reduce the bit error rate for the link.

The network controller 104 includes PHY circuitry 106 generally configured to interface the node 102 with the link partner 120, via communications link 126. PHY circuitry 106 may comply or be compatible with, the aforementioned switched fabric communications protocol, which may include, for example, 10GBASE-KR, 40GBASE-KR4, 40GBASE-CR4, 100GBASE-CR10, 100GBASE-CR4, 100GBASE-KR4, and/or 100GBASE-KP4 and/or other PHY circuitry that is compliant with the aforementioned Infiniband communications protocol and/or compliant with another and/or after-developed communications protocol. PHY circuitry 106 includes transmit circuitry (Tx) 116 configured to transmit data packets and/or frames to the link partner 120, via link 126, and receive circuitry (Rx) 118 configured to receive data packets and/or frames from the link partner 120, via link 126. Of course, PHY circuitry 106 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuitry 118 may include phase lock loop circuitry (PLL, not shown) configured to coordinate timing of data reception from the link partner 120. The communications link 126 may comprise, for example, a media dependent interface that may include, for example, copper twin-axial cable, backplane traces on a printed circuit board, etc. In some embodiments, the communications link 126 may include a plurality of logical and/or physical channels (e.g., differential pair channels) that provide separate connections between, for example, the Tx and Rx 116/118 of the node 102 and Rx 146 and Tx 148, respectively, of PHY circuitry 136 of the link partner 120.

Network controller 104 also includes a backchannel module 108, an equalizer settings module 110, a modulation module 112, a demodulation module 114, a low rate clock (LRC) 122 and a high rate clock (HRC) 124. The high rate clock HRC 124 is configured to provide a clock signal related to the link rate, for example, a clock rate that corresponds to a maximum link rate capability of the network controller 104. For example, the link rate may be on the order of tens, hundreds or more gigabits per second.

Backchannel module 108 is configured to perform backchannel operations between the node 102 and link partner 120. In general, backchannel module 108 is configured to communicate with the link partner 120 to establish link rate, to exchange link capabilities and/or to facilitate equalizer adjustment, as described herein. Backchannel module 108 is configured to communicate backchannel information with link partner 120 at a rate that is less than the link rate during link initialization, before and/or during equalizer setting adjustment, i.e., when the link is operating at the link rate, as described herein.

The low rate clock LRC 122 is configured to provide a clock signal for the backchannel communication (i.e., the low rate bit stream that includes the backchannel information). The clock rate of LRC 122 is less than the clock rate of HRC 124. The clock rate of LRC 122 may be related to the clock rate of HRC 124, e.g., may correspond to the HRC 124 divided by a factor. Generally, the factor may be on the order of 1000. In some embodiments, the factor may be selected so that the clock rate of LRC 122 complies with one or more of the aforementioned communication protocols. For example, the factor may be 1280 so that LRC 122 clock rate is 1/1280 of the HRC 124 clock rate. The factor is configured to be sufficiently large so as to provide robust backchannel communication via a link, e.g., link 126, that is operating at data mode link speed, i.e., operating at the high rate.

Backchannel communication may include commands and/or data ("backchannel information") utilized by network controller 104 and link partner 120 for establishing the link rate, exchanging link capabilities, adjusting equalizer settings and/or determining quality of equalization. Backchannel information may include a sequence of low rate bits (LRBs), i.e., bit rate corresponds to LRC 122 clock rate. The low rate bits may be arranged in frames for transmission to link partner 120. Arranging the transmitted backchannel information into frames is configured to facilitate establishing the link rate. For example, frame synchronization or lack thereof may be utilized by node element 102 and link partner 120 to adjust their respective bit rates to achieve a target link rate. Backchannel information may be carried on the link established between node 102 and link partner 120. Prior to and/or during equalizer adjustment, backchannel information (LRBs) may be transmitted and/or received simultaneously with a high rate (HR) bit sequence (i.e., bit rate corresponds to HRC 124 clock rate) used for equalizer adjustment. The HR bit sequence may be modulated by LRBs representing the backchannel information. The LRBs may be encoded prior to being modulated onto the HR bit sequence, as described herein. The encoding and modulation of the backchannel information onto the HR bit sequence is configured to provide robust backchannel communication prior to and/or during link equalization, in the presence of errors in received HRBs. The modulated HR bit sequence may then be provided to PHY circuitry 106 for transmission to link partner 120 via link 126.

Once the operating bit rates have been adjusted so that the node 102 and link partner 120 are operating at the same link rate, backchannel communication may be utilized to facilitate equalizer adjustment at both node 102 and link partner 120. Equalizer settings module 110 is configured to communicate with link partner 120 to adjust equalizer settings for the link 126. Equalizer settings are typically adjusted while transmitting (and receiving) at the link rate (i.e., data mode link rate). Low rate backchannel information modulated onto link rate bit sequences may facilitate link equalization and/or determining the quality of equalization while equalizer settings are being adjusted. For example, backchannel communication may continue during equalizer adjustment and may thus be utilized by node 102 and link partner 120 for communication during equalizer adjustment.

Similar to node 102, link partner 120 includes a network controller 134. The network controller 134 includes PHY circuitry 136, backchannel module 138, equalizer settings module 140, modulation module 142, demodulation module 144, low rate clock 152 and high rate clock 154. The functionality of elements 134, 136, 138, 140, 142, 144, 146, 148, 152 and 154 are similar to the functionality of similarly named elements of node 102. For example, during the link initialization period, the link partner modulation module 142 may be configured to modulate a second high rate bit stream with a second low rate bit stream for transmission to node 102. The second low rate bit stream includes backchannel information. Node 102 demodulation module 114 may then be configured to demodulate a received second high rate bit stream that corresponds to the transmitted high rate bit stream, as described herein.

A received HR bit sequence related to the transmitted modulated HR bit sequence may be received by PHY circuitry 136 of link partner 120. Rx 146 is configured to determine whether each received bit corresponds to a logic zero or a logic one. Rx 146 may then provide a receiver bit decision (RBD) related to a transmitted HRB for each recovered bit to demodulation module 144. Because of link characteristics, e.g., finite link frequency response, particularly prior to equalizer adjustment, RBDs may include errors. Such errors are generally more likely at relatively higher bit rates. Demodulation module 144 is configured to receive RBDs from Rx 146 and to recover LRBs, corresponding to the backchannel information, in the presence of bit errors in the RBDs, as described herein.

Thus, node element 102 and link partner 120 are configured to communicate via link 126 to perform link initialization functions, including setting link rate, equalizer setting adjustments and/or determining quality of equalization. Node element 102 and link partner 120 are configured to modulate low rate backchannel information on high rate bit sequences (i.e., bit streams) used for, e.g., adjusting equalizer settings. Thus, backchannel information included in a low rate bit stream may be communicated while operating the link at data mode link speeds prior to and/or during equalizer adjustment, avoiding mode switching between a backchannel mode and an operating mode.

Figure 2A:
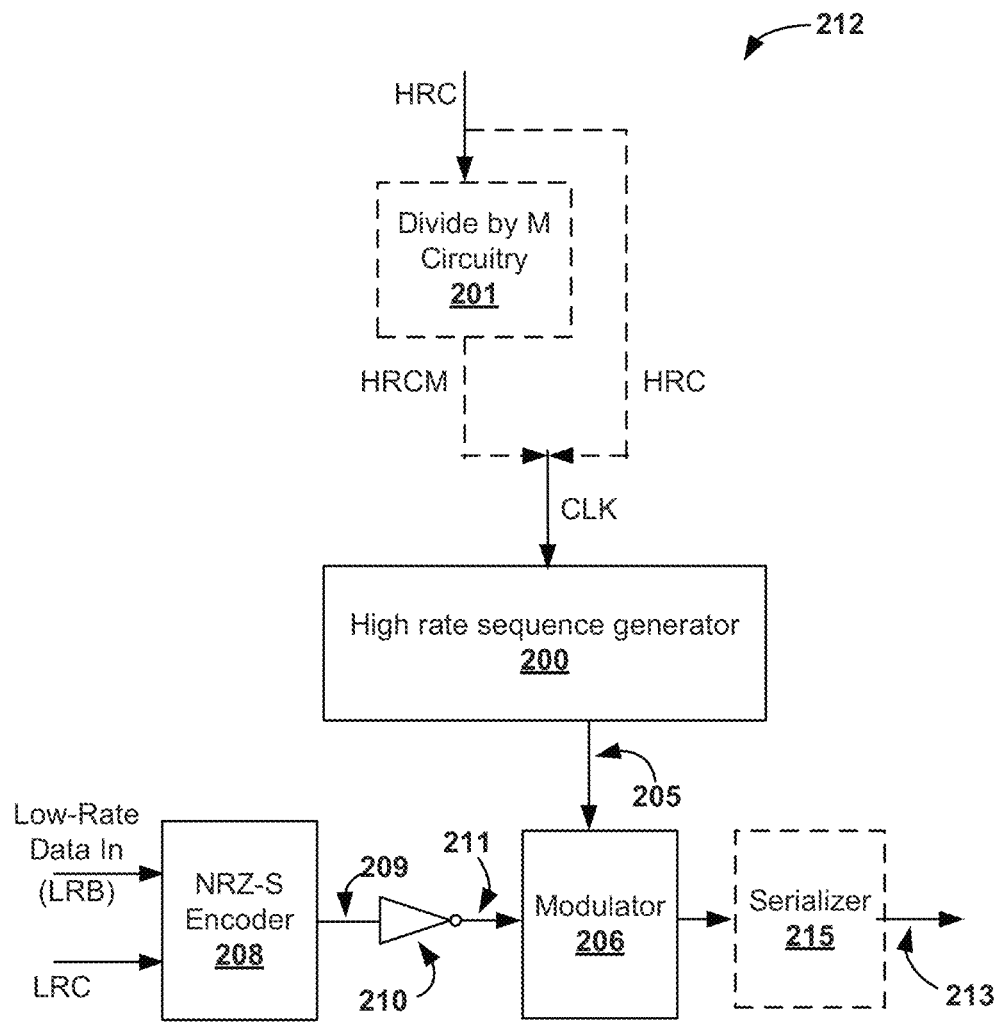
FIG. 2A illustrates an example of a modulation module consistent with various embodiments of the present disclosure.

FIG. 2A illustrates an example of a modulation module 212 consistent with various embodiments of the present disclosure. Modulation module 212 is an example of the modulation modules 112, 142 of FIG. 1. Modulation module 212 is configured to generate a high rate bit sequence and to modulate the high rate bit sequence with low bit rate encoded backchannel information (i.e., commands and/or data). In some embodiments, the high rate bit sequence may be a high rate pseudorandom bit sequence (PRBS). Modulation module 212 may be configured for parallel operation or serial operation, as described herein.

In some embodiments, modulation module 212 may include divide by M circuitry 201. Divide by M circuitry 201 is configured to receive a clock signal from a high rate clock, e.g., HRC 124, and to divide the clock rate by M, producing clock signal HRCM. For example, the divided clock may be provided to a parallelized high rate bit sequence generator, as described herein.

Modulation module 212 includes a high rate bit sequence generator 200 configured to generate a high rate bit sequence output 205. High rate bit sequence generator 200 is configured to receive a clock signal CLK. The clock signal CLK may correspond to the high rate clock signal from HRC or a divided clock signal HRCM, based at least in part, on a configuration of high rate bit sequence generator 200. For example, high rate bit sequence generator 200 may be configured to generate the HR bit sequence serially. In this example, high rate bit sequence generator 200 may be configured to receive the high rate clock signal from HRC 124 and to generate one output bit (i.e., one HRB) for each HRC clock cycle. Thus, in this example, output 205 corresponds to one bit per HRC clock cycle. In another example, high rate bit sequence generator 200 may be configured to generate the HR bit sequence in a parallelized manner. In this example, high rate bit sequence generator 200 may be configured to receive the divided high rate clock signal HRCM and to produce M output bits in parallel for each HRCM clock cycle. In this example, output 205 corresponds to M bits (in parallel) per HRCM clock cycle. Thus, a parallelized high rate bit sequence generator may produce a bit sequence at the high rate using a relatively lower rate clock signal.

Modulation module 212 also includes non-return to zero-space (NRZ-S) encoder circuitry 208, an inverter 210 and a modulator 206. In some embodiments, modulation module 212 may include a serializer 215. In these embodiments, high rate bit sequence generator 200 may be configured to produce M bits of the high rate bit sequence in parallel at HRCM clock cycle intervals. Such parallel M-bit sequences may then be modulated by modulator 206 and the modulated parallel M-bit sequences may be provided to serializer 215 for serializing to produce a modulated high rate bit sequence output 213. In other embodiments, e.g., high rate bit sequence generator 200 configured serially, serializer 215 may not be included and the output of modulator 206 may then correspond to the modulated high rate bit sequence output 213.

NRZ-S encoder circuitry 208 is configured to receive low rate backchannel commands and/or data (i.e., low rate bit (LRB) sequence) and low rate clock (e.g., LRC 122) and to provide an NRZ-S output 209 for each LRC clock cycle (and, therefore, each LRB). Thus, a duration of each LRB corresponds to one LRC clock cycle. The NRZ-S encoder circuitry 208 is configured to transition the NRZ-S output 209 based, at least in part, on the LRB. For example, the NRZ-S encoder circuitry 208 may be configured to transition the NRZ-S output 209 if the LRB input is a logic zero and to maintain its prior output state if the LRB input corresponds to a logic one. Thus, the NRZ-S output 209 depends on a current LRB input and a prior output 209 of the NRZ-S encoder circuitry 208. The NRZ-S output 209 is provided to an inverter 210, yielding an inverted (i.e., complemented) NRZ-S output 211.

For example, if a current LRB input corresponds to a logic zero, then if the prior NRZ-S output 209 was zero, NRZ-S encoder circuitry 208 will transition a new NRZ-S output 209 to a logic one in response to an LRC 122 clock pulse (e.g., in response to a rising edge of the LRC 122 clock pulse) and if the prior NRZ-S output 209 was one, NRZ-S encoder circuitry 208 will transition the new NRZ-S output 209 to a logic zero in response to an LRC 122 clock pulse. In another example, if the current LRB input corresponds to a logic one, then if the prior NRZ-S output 209 was zero, the new NRZ-S output 209 will remain a logic zero and will not change in response to an LRC 122 clock pulse and if the prior NRZ-S output 209 was one, the new NRZ-S output 209 will remain a logic one and will not change in response to the LRC 122 clock pulse. Thus, inverted NRZ-S output 211 will transition if the current LRB input corresponds to a logic zero and will maintain its prior state if the current LRB input corresponds to a logic one.

NRZ-S encoding (and decoding, as described herein) is configured to accommodate polarity inversions resulting from cross-wiring of true and complement signals in a printed circuit board. Polarity inversions may produce errors when bit recovery is based on a value (e.g., a voltage) associated with the bit. Encoding LRBs according to the existence or absence of a transition provides an encoded output that is independent of polarity inversions since decoding accuracy depends on an ability to detect a transition rather than recovering a value.

The inverted NRZ-S output 211 corresponds to an encoded LRB and represents the LRB input for each clock cycle of the low rate clock LRC. Thus, a plurality of encoded LRBs correspond to a low rate bit stream that includes backchannel information. A sequence of LRBs that represents backchannel commands and/or data may be arranged in frame(s), as described herein. The frame structure is configured to facilitate synchronization of both ends (i.e., node element 102 and link partner 120) of link 126.

Modulator 206 is configured to modulate the HR bit sequence generator output 205, i.e., high rate bits (HRB(s)) with the encoded LRB 211. For example, if the encoded LRB 211 corresponds to a logic zero, then the modulated output may correspond to output 205, i.e. true HRB. If the encoded LRB 211 corresponds to a logic one, then the modulated output may correspond to a complemented output 205, i.e., complemented HRB. As used herein, "true HRB" means a modulated HR bit that corresponds to a bit of high rate bit sequence generator output 205 (i.e., is uncomplemented) and "complemented HRB" means a modulated HR bit that corresponds to an inverted high rate sequence generator output 205 bit.

Thus, modulation module 212 is configured to receive a high rate clock signal from HRC 124, a low rate clock signal from LRC 122 and a low rate bit stream corresponding to backchannel commands and/or data. Modulation module 212 is further configured to generate a HR bit sequence (serially or in parallel) with a serial bit rate corresponding to a clock rate of HRC 124 and to modulate the HR bit sequence with encoded LRBs having a bit rate corresponding to a clock rate of LRC 122 to produce the modulated HR bit stream output 213. Thus, modulated HR bit stream output 213 corresponds to a high rate bit stream modulated with a low rate bit stream. Since the HRC clock rate is higher than the LRC clock rate, one LRB may modulate a plurality of HRBs. The modulated HR bit stream output 213 may then be provided to Tx 116 of PHY circuitry 106 for transmission to link partner 106 via link 126.

Figure 2B:
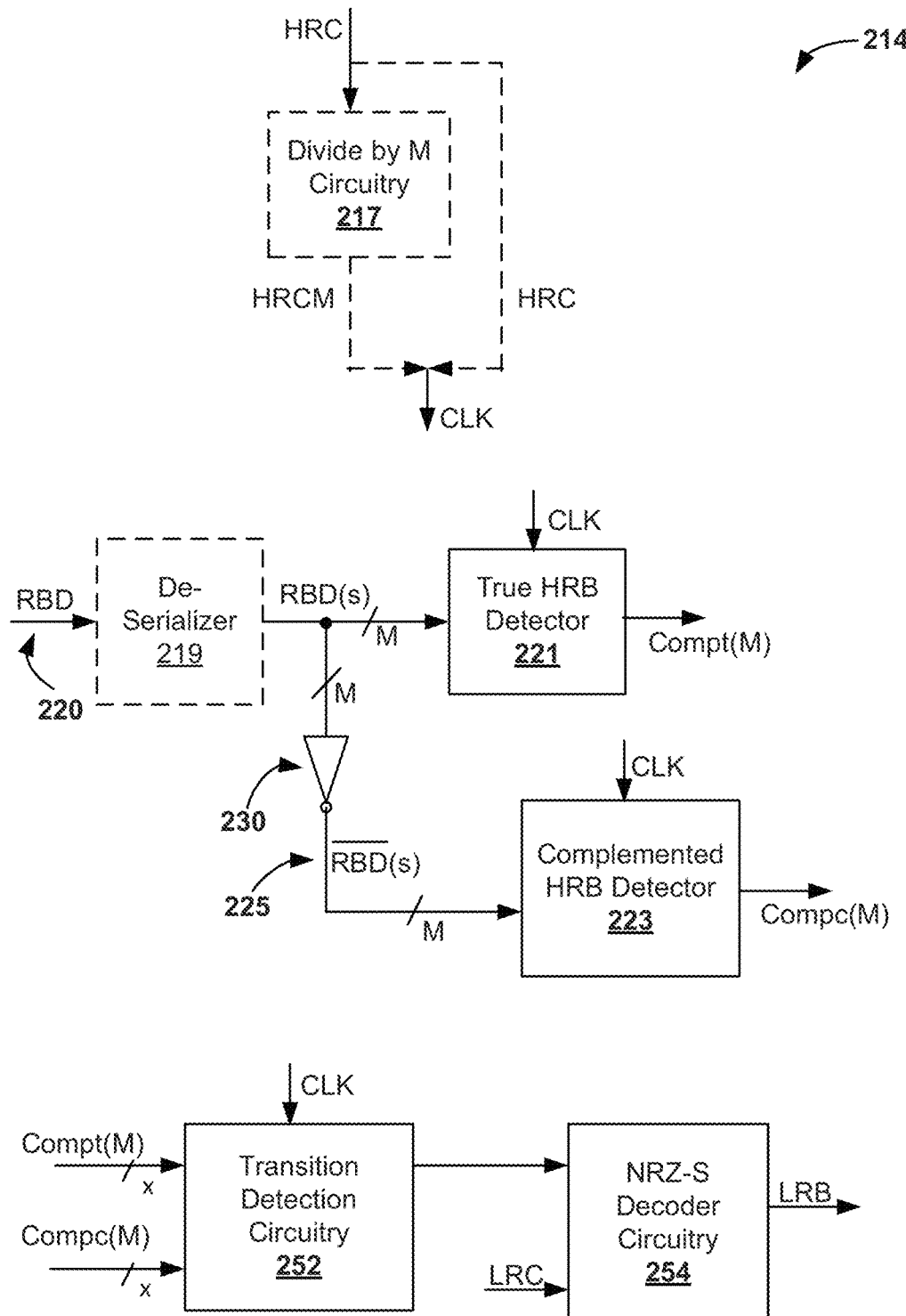
FIG. 2B illustrates an example of a demodulation module consistent with various embodiments of the present disclosure.

FIG. 2B illustrates an example 214 of a demodulation module consistent with various embodiments of the present disclosure. Demodulation module 214 is an example of the demodulation modules 114, 144 of FIG. 1. Demodulation module 214 is configured to receive one or more receiver bit decision(s) RBD 220 from, e.g., receiver 146 in PHY circuitry 136 and to recover (i.e., determine) a backchannel command and/or data bit (LRB) based, at least in part, on the received RBD(s). Each RBD is related to a modulated HRB (in a HR bit stream) that has been transmitted from node 102 by network controller 104 via link 126 and received by network controller 134 of link partner 120. RBD 220 may correspond to a modulated HRB (i.e., a true HRB or complemented HRB) or may have been corrupted during travel along link 126 and thus, may be an error bit. Demodulation module 214 is configured to recover the backchannel command and/or data bit LRB based, at least in part, on a plurality of RBDs 220 that may include one or more error bits. Demodulation module 214 is configured to receive a high rate clock signal from an HRC, e.g., link partner HR clock 154 of FIG. 1. Demodulation module 214 may be configured for parallel operation or serial operation, as described herein.

Similar to modulation module 212, in some embodiments, demodulation module 214 may include divide by M circuitry 217. Divide by M circuitry 217 is configured to receive a clock signal from a high rate clock, e.g., HRC 124, and to divide the clock rate by M, producing clock signal HRCM. For example, the divided clock signal HRCM may be provided to a parallelized true HRB detector and/or parallelized complemented HRB detector configured to process M RBDs in parallel, as described herein.

Demodulation module 214 includes a true HRB detector 221, a complemented HRB detector 223 and an inverter 230. True HRB detector 221 and complemented HRB detector 223 are configured to receive clock signal CLK. In some embodiments, demodulation module 214 may include a deserializer 219. Deserializer 219 is configured to receive a serial bit stream of RBDs and to parallelize each M serial HRBs. In these embodiments, CLK may correspond to the HRCM clock signal. In these embodiments, true HRB detector 221 and complemented HRB detector 223 may be configured to receive the HRCM clock signal and to process M bits in parallel, as described herein. In these embodiments, inverter 230 may be configured to invert the M bits. In other embodiments, demodulation module 214 may be configured to process RBDs serially. In these embodiments, CLK may correspond to HRC clock signal. In these embodiments, true HRB detector 221, complemented HRB detector 223 and inverter 230 may be configured to process individual RBDs at the HRC clock rate, as described herein.

The true HRB detector 221 is configured to detect RBDs that correspond to transmitted true HRBs. The true HRB detector 221 is configured to determine whether each RBD corresponds to a true HRB based, at least in part, on a plurality of RBDs. The complemented HRB detector 223 is configured to detect RBDs that correspond to transmitted complemented HRBs. The complemented HRB detector 223 is configured to determine whether each RBD 225 corresponds to a complemented HRB based, at least in part, on a plurality of inverted RBDs 225. The true HRB detector 221 and complemented HRB detector 223 are configured to output respective counts (e.g., Compt(M) and Compc(M)) related to a number of detected true HRBs and a number of detected complemented HRBs received in a time interval.

For example, for true HRB detector 221 and complemented HRB detector 223 configured to process RBDs in parallel, true HRB detector 221 may be configured to output a count ComptM that corresponds to a number of differences between M predicted true HRBs and a corresponding M RBDs. Similarly, complemented HRB detector 223 may be configured to output a count CompcM that corresponds to a number of differences between M predicted complemented HRBs and a corresponding M RBDs.

In another example, for true HRB detector 221 and complemented HRB detector 223 configured to process RBDs serially, true HRB detector 221 may be configured to output a logical value Compt configured to indicate whether an RBD corresponds to a true HRB for each RBD 220. Similarly, complemented HRB detector 223 may be configured to output a logical value Compc configured to indicate whether an RBD corresponds to a complemented HRB for each RBD 220.

Demodulation module 214 further includes transition detection circuitry 252 and NRZ-S decoder circuitry 254. Transition detection circuitry 252 is configured to detect a transition between true HRBs and complemented HRBs (e.g., true to complemented or complemented to true). Existence of a transition is configured to indicate that a logic zero LRB was transmitted and absence of a transition in a time interval related to an LRC clock cycle is configured to indicate that a logic one LRB was transmitted. Transition detection circuitry 252 is configured to receive clock signal CLK, a comparison true output (Compt(M)) from true HRB detector 221 and a comparison complemented output (Compc(M)) from complemented HRB detector 223. For example, transition detection circuitry 252 is configured to receive clock HRCM, ComptM and CompcM for parallel configurations. In another example, transition detection circuitry 252 is configured to receive clock HRC, Compt and Compc for serial configurations. Transition detection circuitry 252 is further configured to detect a transition based, at least in part, on a comparison of counts related to ComptM and ComptcM for parallel configurations and a comparison of counts related to Compt and Compc for serial configurations, as described herein. Transition detection circuitry 252 is configured to provide an output related the counts and/or comparison.

NRZ-S decoder circuitry 254 is configured to receive the LRC clock signal and the output of the transition detection circuitry 252. NRZ-S decoder circuitry 254 is configured to output an appropriate (i.e., recovered) low rate bit (LRB) based, at least in part, on the output of transition detection circuitry 252. For example, if the output indicates a transition, then NRZ-S decoder circuitry 254 may be configured to provide a logic zero output and if the output indicates the absence of a transition for a time period related to an LRC clock cycle, then the NRZ-S decoder circuitry 254 may be configured to provide a logic one output.

Thus, modulation module 212 is configured to generate a high rate bit stream and to modulate low rate bits corresponding to backchannel information onto the high rate bit stream. In some embodiments, the generating and/or modulating may be parallelized, thus utilizing a reduced rate clock, as described herein. Demodulation module 214 is configured to receive a plurality of receiver bit decisions (RBDs) and to determine (i.e., detect) whether an LRB corresponding to a logic one or an LRB corresponding to a logic zero was transmitted based, at least in part, on detection of RBDs corresponding to true and/or complemented HRBs. Detection of RBDs corresponding to true and/or complemented HRBs is configured to detect existence or absence of a transition between true and complemented HRBs, as described herein.

Figure 3A:
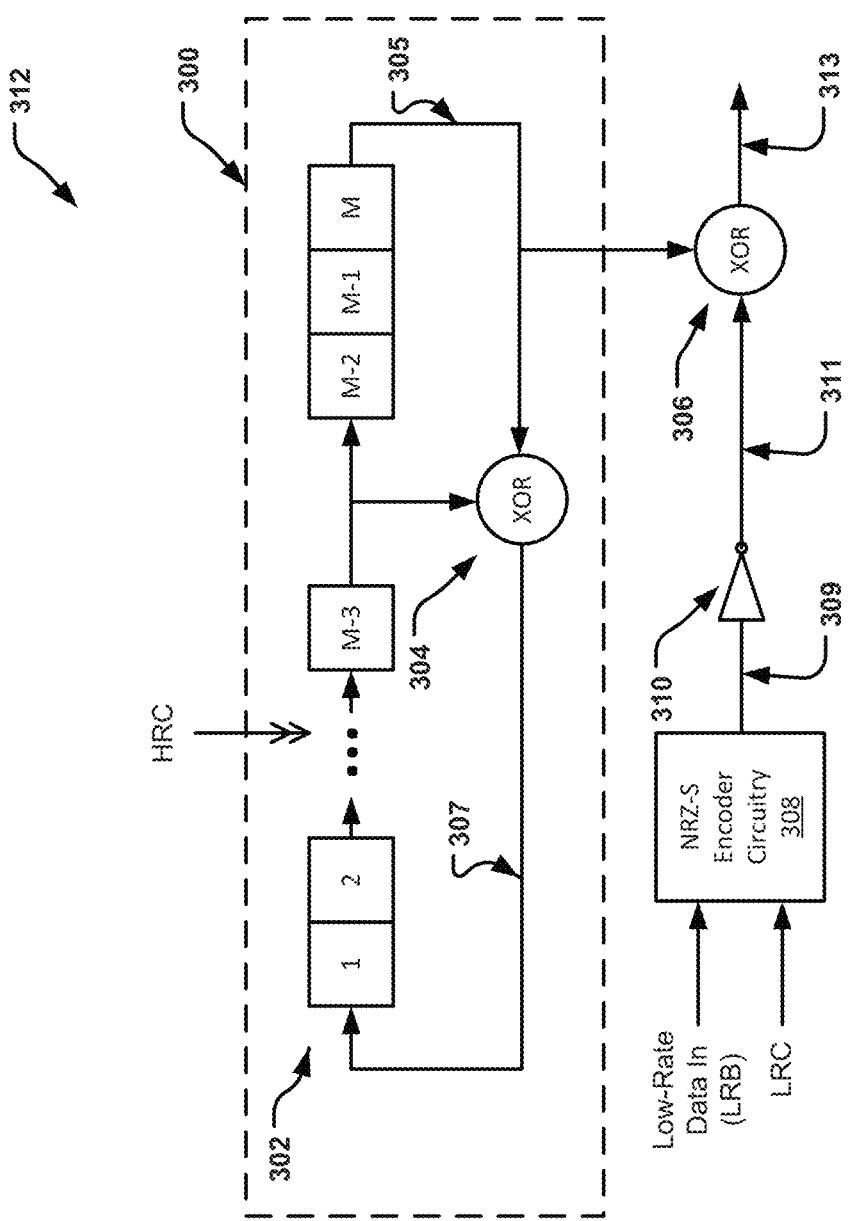
FIG. 3A illustrates an example of a modulation module configured for serial operation consistent with one embodiment of the present disclosure.

FIG. 3A illustrates an example of a modulation module 312 consistent with one embodiment of the present disclosure. Modulation module 312 is one example of the modulation module 212 of FIG. 2A and is configured for serial operation. Modulation module 312 is configured to generate a high rate bit sequence and to modulate the high rate bit sequence with low bit rate encoded backchannel information (i.e., commands and/or data).

Modulation module 312 includes a high rate (HR) bit sequence generator 300 configured to generate a high rate pseudorandom bit sequence (PRBS). Of course, other high rate bit sequence generators configured for serial operation may be utilized to generate HR bit sequences that may or may not be random. Generally, PRBS generators are configured to produce bit sequences that are random over an interval but that repeat over a plurality of intervals. A duration (i.e., number of bits) in the interval is related to a configuration of the PRBS generator. For a configuration such as HR bit sequence generator 300, the duration is related to a number of bits (M) in the shift register, a number of taps and location(s) of the taps. An M-bit PRBS generator may be configured to produce a random bit sequence that repeats at a maximum of $K=2^M-1$ bits per interval. For example, HR bit sequence generator 300 may have an associated maximum random bit interval when M=31 and one tap is located between bits M−3 (i.e., bit 28) and bit M−2 (i.e., bit 29). Of course, other PRBS generators may use different bit lengths, more or fewer taps and one or more different locations, depending on available memory, available processor bandwidth, etc.

HR bit sequence generator 300 includes a shift register 302 and an exclusive-OR module 304. Shift register 302 includes M bits and is configured to receive a clock signal (e.g., clock pulse) from a high rate clock, e.g., HRC 124. Shift register 302 is configured to "shift" each bit in response to a change in state of the input from HRC 124 (e.g., rising edge of HR clock pulse). For example, shift register 302 may include M D-type flip-flops with an output of each flip flop coupled to an input of an adjacent flip flop. An input to shift register 302 corresponds to an input to bit 1 and an output 305 of bit M corresponds to an output of the shift register 302. In operation, in response to a clock pulse from HRC 124, the output of bit 1 is shifted into bit 2, the output of bit 2 is shifted into bit 3, and so on for each bit in the shift register 302. Due to characteristics of the shift register, e.g., propagation delays and set up times, a new stored value of bit m corresponds to a prior stored value of bit m−1 for $2 \leq m \leq M$. HR bit sequence generator 300 includes taps configured to couple the respective outputs of bits M−3 and M (i.e., output 305) to respective inputs of XOR 304 and an output 307 of XOR 304 is coupled to the input of bit 1 of shift register 302. This configuration results in a HR bit sequence generator with a bit rate corresponding to the clock rate of HRC 124 and a random bit sequence that repeats every K ($=2^M-1$) bits (i.e., maximum random bit interval). In operation, the shift register 302 is initialized with at least one nonzero bit. Initializing the shift register 302 with all zeros results in a bit sequence of all zeros, i.e., not random. The HR bit sequence generator output 305, e.g., a sequence of pseudorandom high rate bits (HRBs), may then be modulated by encoded backchannel information.

Modulation module 312 also includes non-return to zero-space (NRZ-S) encoder circuitry 308, an inverter 310 and a modulator XOR 306. NRZ-S encoder circuitry 308 is configured to receive low rate backchannel commands and/or data (i.e., low rate bit (LRB) sequence) and low rate clock (e.g., LRC 122) and to provide an NRZ-S output 309 for each LRC clock cycle (and, therefore, each LRB). Thus, a duration of each LRB corresponds to one LRC clock cycle. The NRZ-S encoder circuitry 308 is configured to transition the NRZ-S output 309 based, at least in part, on the LRB.

For example, the NRZ-S encoder circuitry 308 is configured to transition the NRZ-S output 309 if the LRB input is a logic zero and to maintain its prior output state if the LRB input corresponds to a logic one. Thus, the NRZ-S output 309 depends on a current LRB input and a prior output 309 of the NRZ-S encoder circuitry 308. The NRZ-S output 309 is provided to an inverter 310, yielding an inverted (i.e., complemented) NRZ-S output 311.

Modulator XOR 306 is configured to modulate the HR bit sequence generator output HRB 305 with the encoded LRB 311 to produce modulated HR bit sequence output 313. If the encoded LRB 311 corresponds to a logic zero, then the modulated HR bit sequence output 313 corresponds to output 305. If the encoded LRB 311 corresponds to a logic one, then the modulated HR bit sequence output 313 corresponds to a complemented output 305. Of course, an XOR module is only one example implementation that may be used to modulate a relatively high rate bit stream with relatively low rate data, and in other embodiments, other modulator implementations may be used to modulate a relatively high rate bit stream with relatively low rate encoded backchannel information.

Thus, modulation module 312 is configured to receive a high rate clock signal from HRC 124, a low rate clock signal from LRC 122 and a low rate bit stream corresponding to backchannel commands and/or data. Modulation module 312 is further configured to generate a HR bit sequence serially with a bit rate corresponding to a clock rate of HRC 124 and to modulate the HR bit sequence with encoded LRBs having a bit rate corresponding to a clock rate of LRC 122 to produce the modulated HR bit stream output 313. Thus, modulated HR bit sequence (i.e., stream) output 313 corresponds to a high rate bit stream modulated with a low rate bit stream. The modulated HR bit stream output 313 may then be provided to Tx 116 of PHY circuitry 106 for transmission to link partner 106 via link 126.

Figure 3B:
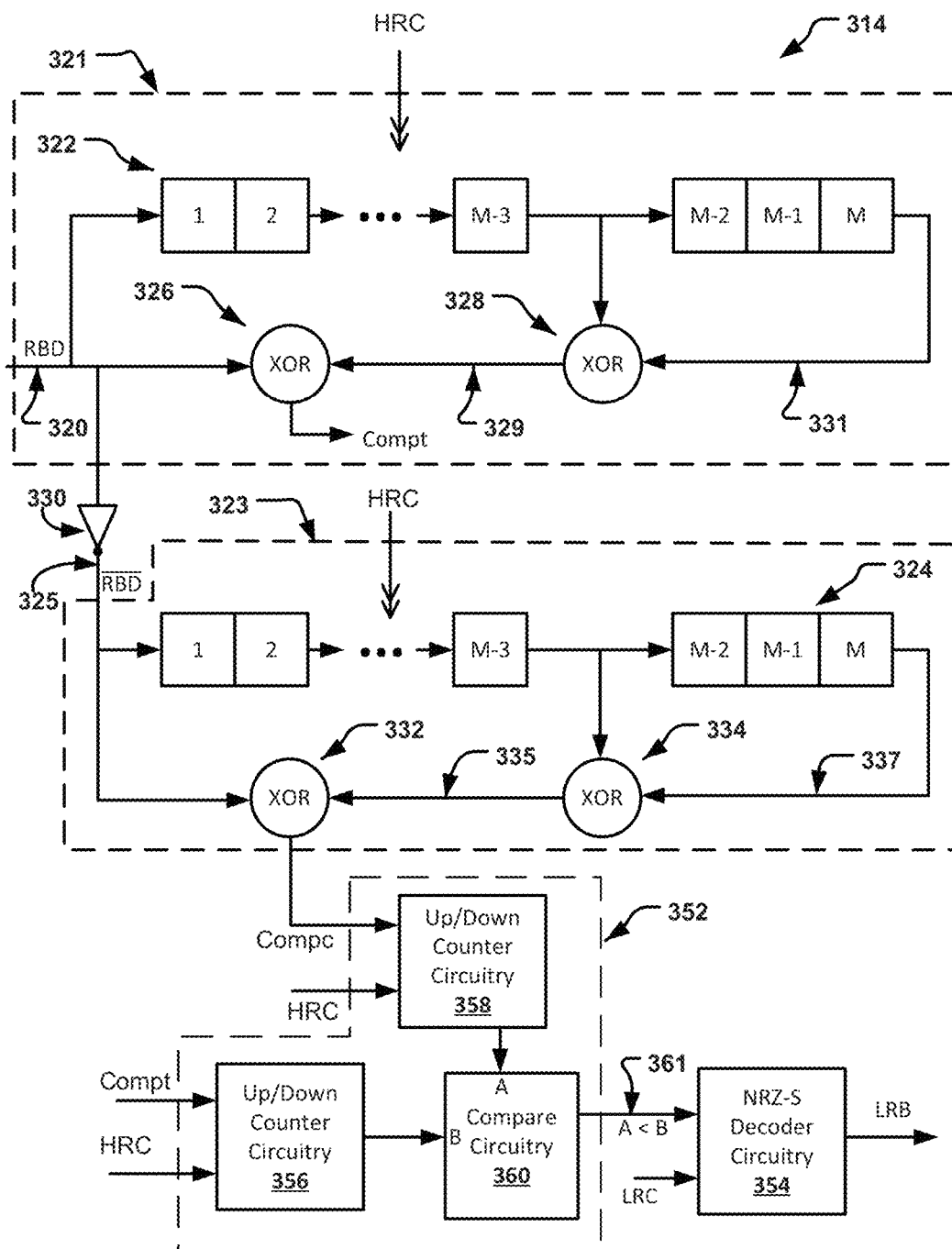
FIG. 3B illustrates an example of a demodulation module configured for serial operation consistent with one embodiment of the present disclosure.

FIG. 3B illustrates an example 314 of a demodulation module consistent with one embodiment of the present disclosure. Demodulation module 314 is one example of the demodulation module 214 of FIG. 2B and is configured for serial operation. Demodulation module 314 is configured to receive a receiver bit decision RBD 320 from, e.g., receiver 146 in PHY circuitry 136 and to recover (i.e., determine) a backchannel command and/or data bit (LRB) based, at least in part, on the RBD. Each RBD is related to a modulated HRB (in a HR bit stream) that has been transmitted from node 102 by network controller 104 via link 126 and received by network controller 134 of link partner 120. RBD 320 may correspond to a modulated HRB (i.e., a true HRB or complemented HRB) or may have been corrupted during travel along link 126 and thus, may be an error bit. Demodulation module 314 is configured to recover the backchannel command and/or data bit LRB based, at least in part, on a plurality of RBDs that may include one or more error bits. Demodulation module 314 is configured to receive a high rate clock signal from an HRC, e.g., link partner HR clock 154 of FIG. 1.

Demodulation module 314 includes a true bit detector 321, a complemented bit detector 323 and an inverter 330. The true bit detector 321 is configured to detect RBDs that correspond to transmitted true HRBs. The true bit detector 321 is configured to determine whether each RBD corresponds to a true HRB based, at least in part, on a plurality of RBDs. The true bit detector 321 includes a first M-bit shift register 322, a first exclusive-OR module XOR 328 and a first comparator XOR 326. The configuration of the first shift register 322 may correspond to the configuration of shift register 302 to support recovery of true HRBs by true bit detector 321. For example, the first shift register 322 is similar to shift register 302 in size (M bits), number of taps (two) and tap location (outputs of bits M–3 and M). True bit detector 321 is configured to receive the RBD 320 and shift the RBD 320 into bit one of the first shift register 322, the output of bit one into bit two of the first shift register 322, etc., in response to the HRC clock pulse (e.g., at the rising edge of the HRC clock pulse). The first shift register 322 and first XOR module 328 are configured to produce a predicted true HRB 329 at the output of the first XOR module 328. The predicted true HRB 329 is configured to correspond to the output 307 of XOR module 304 of FIG. 3A that is also the input to bit one of shift register 302 of HR bit sequence generator 300. In the absence of bit errors, the predicted true HRB 329 is configured to correspond to the input to bit one of shift register 302 of HR bit sequence generator 300 when a sequence of RBDs corresponds to a sequence of true HRBs. The input to bit one of the first shift register 322 is the current RBD. Comparator 326 is configured to compare the predicted true HRB 329 and RBD 320. In the absence of a bit error in RBD, comparator 326 output Compt corresponds to a logic zero if the predicted true HRB 329 is the same as RBD 320 (i.e., RBD 320 corresponds to a true HRB) and a logic one otherwise. Thus, true bit detector 321 is configured to detect RBDs that correspond to transmitted true HRBs by comparing predicted true HRB 329 with RBD 320.

The complemented bit detector 323 is configured to detect RBDs that correspond to transmitted complemented HRBs. The complemented bit detector 323 is configured to determine whether each RBD corresponds to a complemented HRB based, at least in part, on a plurality of inverted RBDs. The complemented bit detector 323 includes a second M-bit shift register 324, a second exclusive-OR module XOR 334 and a second comparator XOR 332. The configuration of the second shift register 324 may correspond to the configuration of shift register 302 to support recovery of complemented HRBs by complemented bit detector 323. For example, the second shift register 324 is similar to shift register 302 in size (M bits), number of taps (two) and tap location (outputs of bits M–3 and M). Complemented bit detector 323 is configured to receive an inverted RBD 325 from inverter 330 and to shift the inverted RBD 325 into bit one of the second shift register 324, the output of bit one into bit two of the second shift register 324, etc. in response to the HRC clock pulse. Similar to true bit detector 321, but with modulated HR bit stream bits corresponding to complemented HRBs, the second shift register 324 and second XOR module 334 are configured to produce a predicted HRB 335 at an output of XOR 334. The predicted HRB 335 is configured to correspond to the output 307 of XOR module 304 of FIG. 3A that is also the input to bit one of shift register 302 of HR bit sequence generator 300. In the absence of bit errors, the predicted HRB 335 is configured to correspond to input to bit one of the shift register 302 of HR bit sequence generator 300 when a sequence of RBDs corresponds to a sequence of complemented HRBs. In other words, predicted HRB 335 is configured to correspond to an inverted complemented HRB. The input to bit one of the second shift register 324 is the inverted current RBD 325. If the current RBD 325 corresponds to a complemented HRB, then the inverted current RBD corresponds to HRB (i.e., inverted complemented HRB). Comparator 332 is configured to compare the predicted HRB 335 and the inverted RBD 325. In the absence of an error, comparator 332 output Compc corresponds to a logic zero if the predicted HRB 335 is the same as inverted RBD 325 (i.e., RBD corresponds to a complemented HRB) and a logic one otherwise. Thus, complemented bit detector 323 is configured to detect transmitted complemented HRBs by comparing predicted HRB 335 with inverted RBD 325.

Initially, shift registers 322 and 324 may not provide usable output since detecting RBDs that correspond to transmitted true or complemented HRBs relies on the shift registers storing a sequence of M RBDs. After M RBDs have been received, each shift register 322, 324 may be fully populated with respective true or complemented RBDs (and possibly error bits) and may begin to provide usable output.

Generally, the output of a two input exclusive OR module is logic zero if both inputs are the same, i.e., both logic zeros or both logic ones, and logic one if the inputs are different, i.e., one input is logic zero and the other input is logic one. If both inputs to the exclusive OR module are complemented, the output of the exclusive OR module is the same as when both inputs to the exclusive OR module are uncomplemented (i.e., not inverted). For example, in the absence of link-induced errors, if the current RBD 320 and prior M RBDs correspond to true HRBs then the first shift register 322 will be populated with true HRBs, the predicted true HRB 329 will correspond to the current RBD 320 (i.e., a true HRB) and the comparator 326 output Compt will be a logic zero. The predicted true HRB 329 corresponds to output 307 of XOR 304 of FIG. 3A. Continuing with this example, the second shift register 324 will be populated with complemented HRBs (i.e., inverted HRBs), the output 335 will correspond to the current RBD 320 rather than the inverted current RBD 325 and the comparator 332 output Compc will be a logic one. In another example, in the absence of link-induced errors, if the current RBD 320 and prior M RBDs correspond to complemented HRB s then the first shift register 322 will be populated with complemented HRBs, the output 329 will correspond to a true HRB rather than to the current RBD (complemented HRB) and the comparator 326 output Compt will be a logic one. Continuing with this example, the second shift register 324 will be populated with true HRBs (inverted RBDs), the predicted HRB 335 will correspond to the inverted current RBD and the comparator 332 output Compc will be a logic zero because the current RBD corresponds to a complemented HRB and, thus, the inverted current RBD 325 corresponds to an inverted-complemented HRB, i.e., true HRB. Thus, the true bit detector 321 is configured to detect transmitted true HRBs and to output (Compt) a logic zero for each detected true HRB and complemented bit detector 323 is configured to detect transmitted complemented HRBs and to output (Compc) a logic zero for each detected complemented HRB. The outputs of true bit detector 321 and complement bit detector 323 may then be utilized to detect transitions between true and complemented HRBs and thereby facilitate recovery of each LRB and the backchannel information.

Demodulation module 314 also includes first up/down counter circuitry 356, second up/down counter circuitry 358, compare circuitry 360 and NRZ-S decoder circuitry 354. The first comparator 326 output Compt is coupled to an input of the first counter circuitry 356 and the second comparator 332 output Compc is coupled to an input of the second counter circuitry 358. Both the first and second counter circuitry 356, 358 are configured to receive an HRC clock signal and to increment (i.e., count up) or decrement (i.e., count down) their respective counts (i.e., first count and second count) according to a respective value of Compt or Compc in response to the HRC clock signal (e.g., in response to a rising edge of the HRC clock pulse). If Compt is a logic one (i.e., RBD not a true HRB), first counter circuitry 356 is configured to count up and if Compt is a logic zero (i.e., RBD corresponds to a true HRB), first counter circuitry 356 is configured to count down. Similarly, if Compc is a logic one, second counter circuitry 358 is configured to count up (i.e., RBD not a complemented HRB) and if Compc is a logic zero (i.e., RBD corresponds to a complemented HRB), second counter circuitry 358 is configured to count down. Thus, if a sequence of RBDs corresponds to a sequence of true HRBs, first counter 356 is configured to count down and the second counter 358 is configured to count up for each RBD in the sequence that is not a bit error. Similarly, if a sequence of RBDs corresponds to a sequence of complemented HRBs, first counter 356 is configured to count up and the second counter 358 is configured to count down for each complemented RBD in the sequence that is not a bit error. Thus, the first count and the second count are related to a number of detected true HRBs and a number of detected complemented HRBs received in a time interval corresponding to the low bit rate.

The first and second counters 356 and 358 are configured with minimum and maximum allowable counter values (i.e., counts). In some embodiments, the minimum allowable counter value may be zero and the maximum allowable counter value may be N. Utilizing counters 356 and 358 and the limits on the counter values are configured to provide robust detection of transitions between sequences of complemented and true modulated HRBs in the presence of bit errors, e.g., before and/or during equalizer setting adjustment. Rather than recognizing a transition based on only two adjacent RBDs, one of which could be a bit error, a sequence of a plurality of RBDs is utilized to improve accuracy in detecting a transition. Limiting the maximum and minimum counter values is configured to facilitate detection of a transition or absence of a transition in a time interval by targeting transitions. The maximum allowable counter value N may be related to the number of bits M in shift registers 302, 322 and 324. For example, the maximum allowable counter value may be approximately three times the number of bits M, e.g., 100, for M equal to 31. Thus, a counter, e.g., counters 356 and 358, may not count up above the maximum counter value and may not count down below the minimum counter value.

As described herein, the clock rate of the LRC may be a fraction of the clock rate of the HRC, thus, each LRB may modulate a sequence of HRBs. For example, the clock rate of LRC may be configured to be 1/1280 of the clock rate of HRC. In this example, each LRB may modulate 1280 HRBs. Limiting the maximum and minimum allowable counter value is configured to facilitate detecting transitions between complemented and true HRBs.

Compare circuitry 360 is configured to compare a first count B and a second count A of the first and second counters 356 and 358, respectively. Compare circuitry 360 is further configured to provide a result 361 of the comparison to NRZ-S decoder circuitry 354. If the second count A is less than the first count B (i.e., A<B), then the comparison result 361 corresponds to a logic one and if the second count A is greater than or equal to the first count B (i.e., A≥B), then the comparison result 361 corresponds to a logic zero. A change in state of the comparison result 361 is configured to correspond to a transition between a sequence of RBDs corresponding to true HRBs and a sequence of RBDs corresponding to complemented HRBs, i.e., transition from true HRBs to complemented HRBs or transition from complemented HRBs to true HRBs. Thus, the first and second counters 356, 358 and compare circuitry 360 are configured to detect transitions between a sequence of RBDs corresponding to true HRBs and a sequence of RBDs corresponding to complemented HRBs in the presence of bit errors in the RBDs.

NRZ-S decoder circuitry 354 is configured to receive the comparison result 361 from compare circuitry 360 and an LRC clock signal. NRZ-S decoder circuitry 354 is configured to provide a received LRB output based, at least in part, on the comparison result 361, in response to an LRC clock pulse, e.g., rising edge of the LRC clock pulse. In operation, NRZ-S decoder circuitry 354 is configured to monitor the comparison result 361 output from compare circuitry 360. If NRZ-S decoder circuitry 354 detects a change of state (i.e., a transition) in the comparison result 361 during a time interval corresponding to a clock cycle (i.e., LRC clock period), NRZ-S decoder circuitry 354 is configured to identify a corresponding transmitted LRB as a logic zero and to output a logic zero in response to the LRC clock pulse. If NRZ-S decoder circuitry 354 does not detect a change of state in the comparison result 361 during the clock period then NRZ-S decoder circuitry 354 may identify a corresponding transmitted LRB as a logic one and output a logic one as the detected LRB in response to the LRC clock pulse. Thus, decoder circuitry 354 is configured to recover each LRB based, at least in part, on a comparison of the first count and the second count.

For example, if RBD 320 corresponds to a true HRB (and assuming no bit errors in RBD), then Compt is a logic zero and Compc is a logic one. First counter 356 will count down, decrementing B, and second counter 358 will count up, incrementing A, at the HRC rate. If a sequence of RBDs that correspond to true HRBs are received, then the first counter 356 may continue to count down, decrementing B, and the second counter 358 may continue counting up, incrementing A. If initially, A≥B (compare circuitry output 361 corresponds to a logic zero), then the first counter 356 may continue counting down at the HRC rate until B reaches a count minimum, e.g., zero, and the second counter 358 may continue counting up at the HRC rate until A reaches a count maximum N, e.g., 100, as long as RBD corresponds to a true HRB. In this scenario, the compare circuitry output 361 will not transition and NRZ-S decoder circuitry 354 may output a logic one, corresponding to an LRB, in response to an LRC pulse. On the other hand, if initially A<B (compare circuitry output 361 corresponds to a logic one), the first counter 356 may count down and the second counter 358 may count up until A=B, at which point, the compare circuitry output 361 will transition from logic one to logic zero. NRZ-S decoder circuitry 354 may then output a logic zero, corresponding to an LRB, in response to an LRC pulse.

Continuing with this example, if true HRBs are being transmitted but the RBDs include some bit errors, the first counter 356 will count down, decrementing B, for RBDs corresponding to true HRBs but will count up for RBDs corresponding to bit errors. Similarly, the second counter 358 will count up, incrementing A, for RBDs corresponding to true HRBs but will count down for RBDs corresponding to bit errors. An effect of the bit errors is to change the point at which the compare circuitry output 361 will transition from logic one to logic zero (for the case where initially A<B). Since the counters 356, 358 are counting at the HRC rate and the HRC rate is higher than the LRC rate by a factor of, e.g., 1280, variation in the transition point by a few HRC intervals may not significantly affect recognizing that the transmitted LRB (i.e., backchannel information bit) was a zero based on the transition in compare circuitry output 361.

Existence of a transition is configured to indicate transmission of a logic zero LRB and absence of a transition in approximately an LRB interval (i.e., one LRC cycle) is configured to indicate transmission of logic one. Initially, absence of a transition in more than one interval, e.g., two intervals, may indicate a transmitted LRB corresponding to a logic one. Depending on initial values of counters, NRZ-S decoder circuitry 354 may not accurately identify a logic one (no transition) for a time interval greater than one LRC clock period. In other words, initially, the absence of a transition for a time interval greater than one LRC clock period may indicate that the transmitted LRB was a logic one.

Thus, demodulation module 314 is configured to receive a sequence of RBDs related to a modulated HR bit sequence (i.e., a sequence of modulated HRBs that may include at least one true HRB and at least one complemented HRB) that may include bit errors. Demodulation module 314 is further configured to demodulate the modulated HR bit sequence to recover a low rate bit stream (that includes backchannel information) based, at least in part, on a number of true HRBs and a number of complemented HRBs. Demodulation module 314 is configured to detect whether a transmitted LRB was a logic zero or a logic one based, at least in part, on the presence or absence of a transition in the received RBDs between complemented and true (or true and complemented) transmitted modulated HRBs. Detecting transitions is configured to accommodate and/or compensate for polarity inversions that may arise from cross wiring of true and complemented signals in, e.g., a printed circuit board. Utilizing a plurality of received RBDs in order to detect the transition is configured to provide robustness in the presence of bit errors associated with the received modulated HRBs, i.e., prior to and/or during equalizer adjustment. Thus, utilizing the teachings of the present disclosure, backchannel information may be reliably communicated over a link operating at the link rate prior to and/or during equalizer adjustment.

Figure 4A:
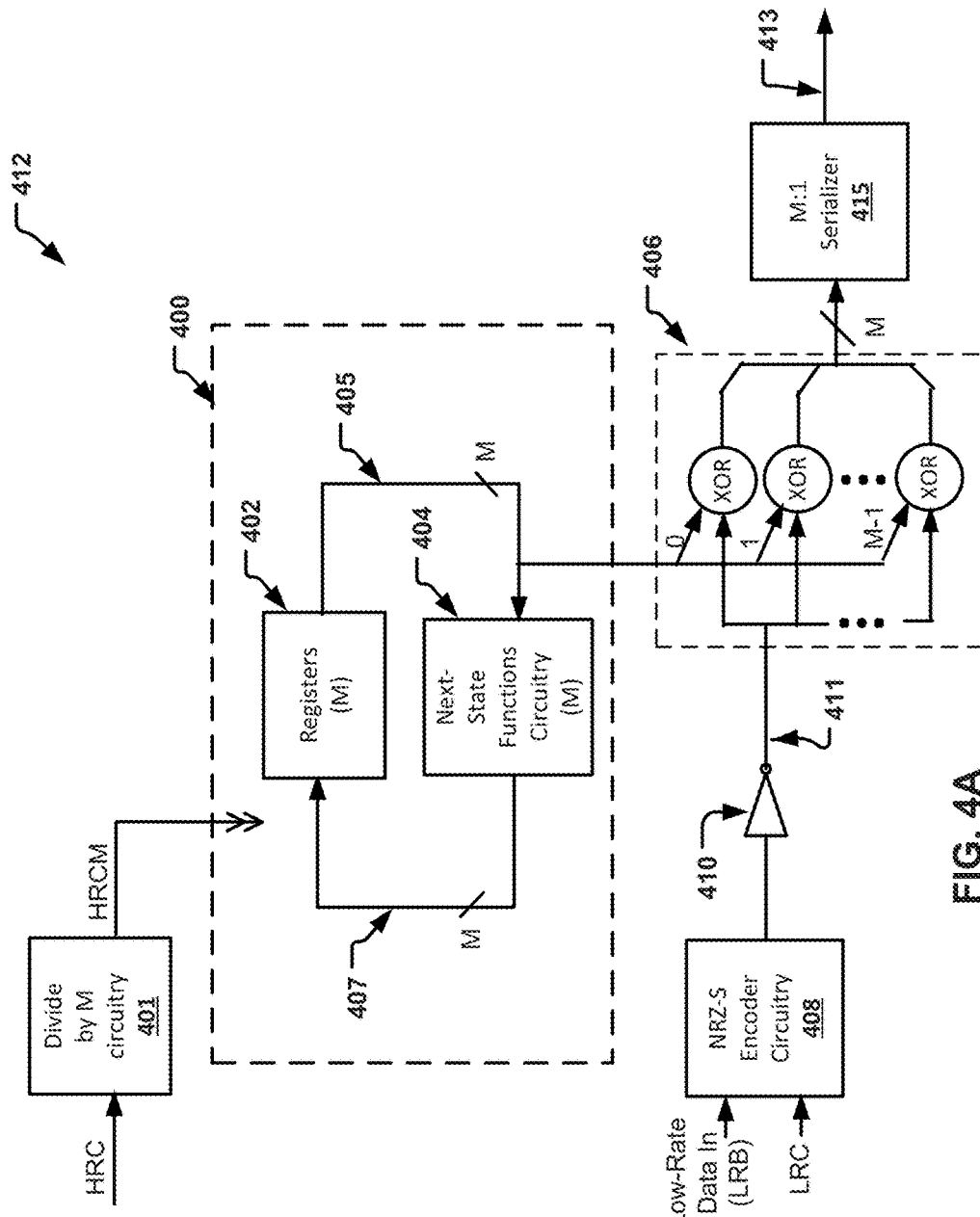
FIG. 4A illustrates an example of a modulation module configured for parallel operation consistent with one embodiment of the present disclosure.

FIG. 4A illustrates an example of a modulation module 412 configured for parallel operation, consistent with one embodiment of the present disclosure. Modulation module 412 includes divide by M circuitry 401, a parallel high rate bit sequence generator 400, NRZ-S encoder circuitry 408, an inverter 410, a modulator 406 and an M to 1 serializer 415. Modulation module 412 is configured to generate a high rate bit sequence, modulate the HR bit sequence with encoded backchannel information and to provide the modulated HR bit sequence to, e.g., transmitter 116 for transmission over link 126.

Divide by M circuitry 401 is configured to receive a clock signal from a high rate clock, e.g., HRC 124, to divide the HRC clock signal by M and provide the divided clock signal (HRCM) to the high rate bit sequence generator 400. For example, M may be 40. Of course, other values of M may be used based, at least in part, on a desired reduction in clock rate and available resources, including, e.g., registers, inverters, XOR modules, etc. The HR bit sequence generator 400 is configured to generate M bits of the HR bit sequence, in parallel, each HRCM clock cycle. Such parallelization is configured to facilitate generation of an HR bit sequence at a clock rate relatively less (by, e.g., a factor of M) than the HRC clock rate. The HR bit rate is maintained by generating M bits in parallel each HRCM clock cycle.

HR bit sequence generator 400 includes a plurality (e.g., M) registers 402 and next-state functions circuitry 404 including M next state functions. Registers 402 are configured to store M HRBs, each HRB related to a respective transmitted HRB, and to output the M HRBs 405 each HRCM clock cycle. The M bits output from registers 402 correspond to a current state and the M bits input to registers 402 correspond to a next state of M bits of the high rate bit sequence. Similar to shift register 302 of FIG. 3A, outputs 405 of registers 402 do not change instantaneously when their inputs 407 change. Next-state functions circuitry 404 may be configured to receive the M current state HRBs 405 and to generate M next state HRBs 407 in parallel, based at least in part, on the M current state HRBs 405. Next state function circuitry 404 may be asynchronous and may thus output M next state HRBs 407 after a setup time associated with registers 402, the setup time less than a clock cycle of HRCM. Next state function circuitry 404 may be configured to generate M HRBs of the high rate bit sequence (i.e., next state HRBs 407), in parallel, for each clock cycle of HRCM. For example, the next-state functions 404 may be configured to generate M pseudorandom next state HRBs. Of course, other HR bit sequences may be generated according to available resources and/or a configuration of the M next-state functions 404. HR bit sequence generator 400 is configured to output M current state HRBs 405 each HRCM clock cycle to modulator 406.

NRZ-S encoder circuitry 408 is configured to receive backchannel information (i.e., low-rate data in) and low rate clock signal. NRZ-S encoder circuitry 408 is further configured to encode the LRBs, then invert the encoded LRBs and provide the inverted encoded LRB output 411 to modulator 406, as described herein. For example, modulator 406 includes M XOR modules, each XOR module configured to receive the inverted encoded LRB output 411 and a respective current state HRB from the HR sequence generator 400 and to exclusive-OR the inverted encoded LRB output 411 and the respective current state HRB. Each current state HRB of the M current state HRBs 405 is an HRB of the HR bit sequence. Thus, modulator 406 is configured to modulate M HRBs in parallel, with an inverted encoded LRB output 411. Modulator 406 is configured to output the M modulated HRBs in parallel. Serializer 415 is configured to receive the parallel M modulated HRBs and to convert the parallel HRBs to serial HRBs 413 with a clock frequency corresponding to the HRC clock frequency. The serialized HRBs 413 may then be provided to transmitter 116 for transmission via link 126.

Thus, modulation module 412 is configured to generate a high rate bit sequence with M bits in parallel and to modulate the HR bit sequence with low-rate backchannel information. Generating M bits of the HR bit sequence in parallel is configured to allow a slower clock rate by a factor of M for the HR bit sequence generator 400.

Figure 4B:
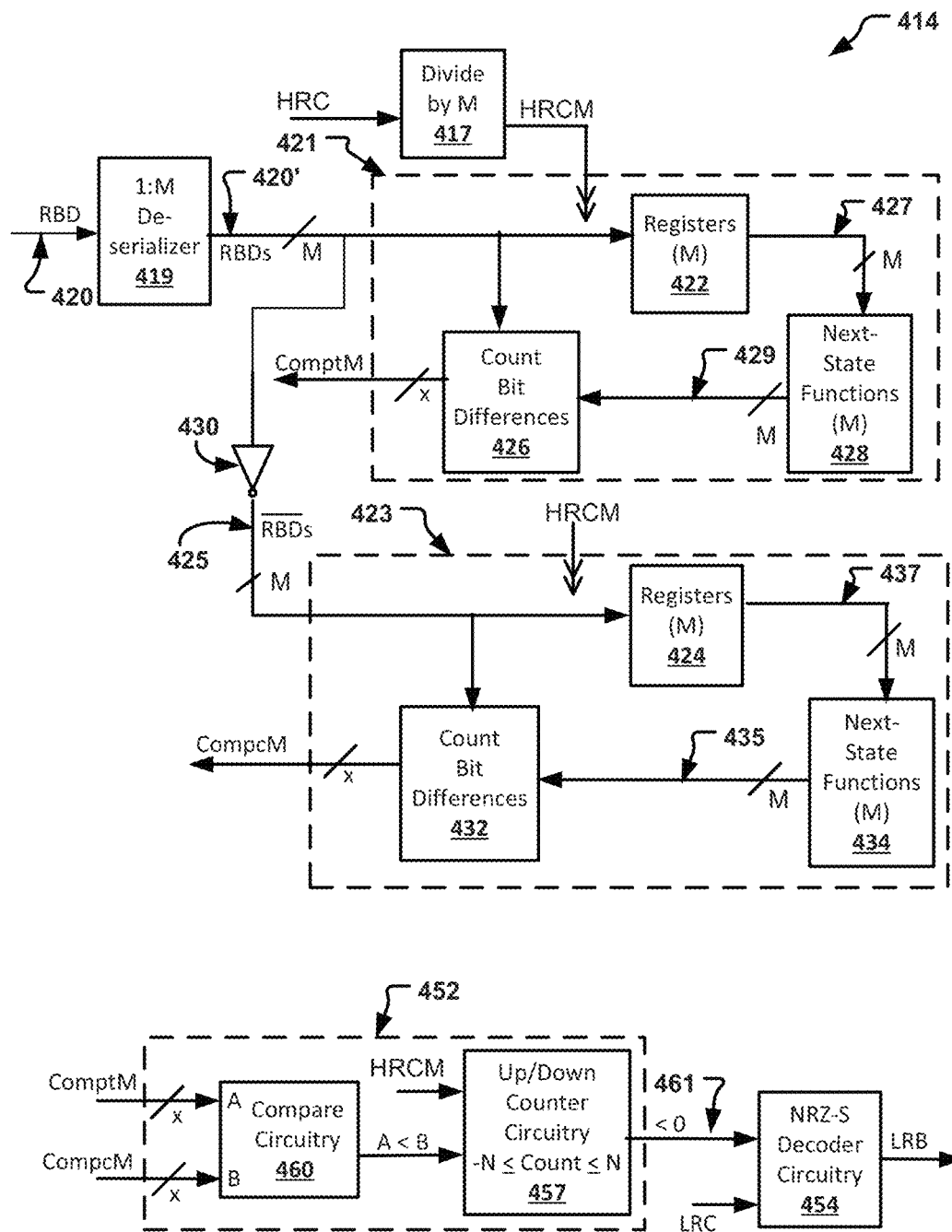
FIG. 4B illustrates an example of a demodulation module configured for parallel operation consistent with one embodiment of the present disclosure.

FIG. 4B illustrates an example of a demodulation module 414 configured for parallel operation consistent with one embodiment of the present disclosure. Demodulation module 414 is one example of the demodulation module 214 of FIG. 2B and is configured for parallel operation. Demodulation module 414 is configured to receive a plurality of receiver bit decisions RBD 420 from, e.g., receiver 146 in PHY circuitry 136 and to recover (i.e., determine) a backchannel command and/or data bit (LRB) based, at least in part, on the RBDs that may include one or more error bits. Demodulation module 414 includes divide by M circuitry 417, a deserializer 419, a true HRB detector 421, an inverter 430, a complemented HRB detector 423, transition detection circuitry 452 and NRZ-S decoder circuitry 454.

Divide by M circuitry 417 is configured to receive a clock signal from a high rate clock, e.g., HRC 124, to divide the HRC clock signal by M and provide the divided clock signal (HRCM) to the true HRB detector 421, the complemented HRB detector 423 and the transition detection circuitry 452. Deserializer 419 is configured to receive a plurality (e.g., M) of serial RBDs 420 and to output the M RBDs in parallel. The M parallelized RBDs 420' may then be provided to the true HRB detector 421 in parallel (i.e., correspond to M next state RBDs 420') and to the inverter 430 in parallel. Inverter 430 is configured to invert each of the M RBDs, in parallel, and to thus, provide as output, M inverted RBDs that correspond to M inverted next state RBDs 425.

True HRB detector 421 includes M registers 422 configured to store M RBDs (i.e., M RBDs corresponding to current state HRBs 427, next-state functions circuitry 428 configured to determine M predicted true next state HRBs 429 and count bit differences circuitry 426 configured to compare the M predicted true next state HRBs 429 with M received next state RBDs 420' and to provide a count of the differences. Registers 422 and next state functions circuitry 428 are configured similarly to registers 402 and next state functions circuitry 404 of FIG. 4A to facilitate detection of true HRBs by true HRB detector 421. The M bits output from registers 422 correspond to a current state and the M bits input to registers 422 correspond to a next state of M bits of the high rate bit sequence.

For example, initially deserializer 419 may provide as output a first M RBDs 420' that may be stored in registers 422 in response to a first clock pulse corresponding to HRCM from divide by M circuitry 417. These first M RBDs may then correspond to a current state HRBs 427 and may be available to next-state functions circuitry 428 (e.g., after a setup time). Next-state functions circuitry 428 is configured to determine the predicted next state HRBs 429 based, at least in part, on the M current state HRBs 427. On a second HRCM clock pulse, a second M RBDs may be available from deserializer 419. These second M RBDs may then correspond to next state RBDs 420'. The predicted next state HRBS 429 determined based, at least in part, on the first M RBDs may be provided to the count bit differences module 426 by the next-state functions circuitry 428. In response to the second HRCM clock pulse, the count bit differences module 426 may be configured to compare the M predicted next state HRBs 429 with the second M RBDs (i.e., actual next state RBDs), bit by bit and to increment a count for each difference, generating a comparison result ComptM. ComptM corresponds to a number of differences between the M next state RBDs 420' and the M predicted next state HRBs 429.

Count bit differences module 426 is configured to provide as output ComptM that corresponds to a binary representation of the count of bit differences between the next state RBDs 420' and the predicted next state HRBs 429 for an HRCM clock interval. ComptM may include a plurality of bits (e.g., x bits), with the number of bits, x, based, at least in part, on the number M of parallel RBDs processed. ComptM is sized to accommodate a maximum number of bit differences, i.e., is configured to represent M. For example, for M=40, ComptM may include 6 bits (i.e., x=6) since 6 bits may represent up to 63 (unsigned integer). ComptM may then be provided to transition detection circuitry 452.

Similarly, complemented HRB detector 423 includes M registers 424 configured to store the M inverted RBDs, next-state functions circuitry 434 configured to determine M predicted next state HRBs 435 and count bit differences circuitry 432 configured to compare the M predicted next state HRBs 435 with M inverted received next state RBDs 425 and to provide a count of the differences. Similar to complemented HRB detector 323 of FIG. 3B, complemented HRB detector 423 is configured to detect complemented HRBs using inverted RBDs that may correspond to inverted complemented HRBs, i.e., true HRBs, when the associated RBDs correspond to complemented HRBs. Registers 424 and next state functions circuitry 434 are configured similarly to the registers 402 and next state function circuitry 404 of FIG. 4A to facilitate detection of complemented HRBs by complemented HRB detector 423. The M bits output from registers 424 correspond to a current state and the M bits input to registers 424 correspond to a next state of M bits of the high rate bit sequence. Complemented HRB detector 423 is configured to operate similar to true HRB detector 421, except with M inverted RBDs 425 as input, and is thus configured to detect complemented HRBs. Count bit differences module 432 is configured to provide as output CompcM that corresponds to a binary representation (e.g., x bits) of the count of bit differences between the inverted next state RBDs 425 and the predicted complemented next state HRBs 435. CompcM may then be provided to transition detection circuitry 452.

Transition detection circuitry 452 includes compare circuitry 460 and up/down counter circuitry 457. Compare circuitry 460 is configured to receive ComptM and CompcM from true HRB detector 421 and complemented HRB detector 423, respectively. Compare circuitry 460 is configured to provide as output a logic zero if ComptM is greater than or equal to CompcM and to provide as output a logic one if ComptM is less than CompcM.

Up/down counter circuitry 457 is configured to count down in response to a clock pulse from HRCM if ComptM is greater than or equal to CompcM and to count up if ComptM is less than CompcM. Up/down counter circuitry 457 may include a maximum count value N and a minimum count value minus N (i.e., −N). Thus, a count of up/down counter circuitry 457 may be in the range of −N to +N, inclusive. Such count value limits are configured to facilitate detecting transitions between true and complemented HRBs. Up/down counter circuitry 457 is configured to provide as output 461 a logic one if the count value is less than zero and a logic zero otherwise, i.e., count value greater than or equal to zero. Up/down counter circuitry 457 output 461 may change state in response to a clock pulse HRCM, i.e., when up/down counter circuitry 457 is configured to update its count value. Thus, the output 461 of up/down counter circuitry 457 may change state, in response to clock pulse HRCM, when its count value decreases to less than zero from greater than or equal to zero or increases to zero from less than zero.

For example, if, in the absence of bit errors, the M next state RBDs 420' correspond to transmitted true HRBs, then the M predicted true next state HRBs 429 may correspond to the M next state RBDs 420' and count bit differences module 426 may output a ComptM of zero. Continuing with this example, M inverted next state RBDs 425 may then not correspond to the M predicted next state HRBs 435 of complemented HRB detector 423 and count bit differences module 432 may output a CompcM that represents a value of M. Since ComptM=0 is less than CompcM=M, compare circuitry 460 may then provide as output a logic one to up/down counter circuitry 457. Up/down counter 457 may then count up one in response to an HRCM clock pulse. If initially, up/down counter circuitry 457 count was greater than or equal to zero, then the output of up/down counter circuitry 457 may remain zero.

Continuing with this example, if one or more groups of M RBDs are received that correspond to transmitted complemented HRBs, then each M next state RBDs 420' may no longer correspond to respective M predicted true next state HRBs 429 and count bit differences module 426 may output a ComptM of greater than zero and less than or equal to M. Each M inverted next state HRBs 425 may then correspond to respective M predicted next state HRBs 435 of complemented HRB detector 423 and count bit differences module 432 may output a respective CompcM that is zero (or near zero depending on bit errors and/or whether the transmitted HRB transitioned from true to complemented within a respective M RBDs). Compare circuitry 460 may then output a respective logic zero for each M RBDs where a respective ComptM is greater than or equal to a respective CompcM. Up/down counter circuitry 457 may then count down in response to HRCM for each comparison where a respective ComptM is greater than or equal to a respective CompcM (as long as the count value is greater than −N). If initially, up/down counter circuitry 457 count was greater than or equal to zero, then the output of the up/down counter circuitry 457 may transition when the count value reaches minus one. This transition is configured to indicate a transition in the RBDs between true and complemented HRBs. Similar to XOR 328 of true HRB detector 321 and XOR 334 of complemented HRB detector 323 of FIG. 3B, next state function circuitry 428 may be equivalent to next state function circuitry 434.

NRZ-S decoder circuitry 454 is configured to receive the output 461 from up/down counter circuitry 457 and the LRC clock signal. NRZ-S decoder circuitry 454 is further configured to provide an LRB output in response to the LRC clock signal based, at least in part, on the output 461 from up/down counter circuitry 457. For example, when the output 461 transitions from zero to one or from one to zero, NRZ-S decoder circuitry 454 is configured to output an LRB corresponding to a logic zero in response to an LRC clock pulse. Continuing with this example, if the output does not transition in a time interval related to a clock cycle of LRC, then the NRZ-S decoder 454 may be configured to output an LRB corresponding to a logic one.

Thus, demodulation module 414 is configured to receive a sequence of RBDs related to a modulated HR bit sequence (i.e., a sequence of modulated HRBs that may include at least one true HRB and at least one complemented HRB) that may include bit errors. Demodulation module 414 is further configured to demodulate a plurality (e.g., M) of RBDs, in parallel, to recover a low rate bit stream (that includes backchannel information) based, at least in part, on a number of true HRBs and a number of complemented HRBs. Demodulation module 414 is configured to detect whether a transmitted LRB was a logic zero or a logic one based, at least in part, on the presence or absence of a transition in a plurality received RBDs between complemented and true (or true and complemented) transmitted modulated HRBs. Processing M RBDs in parallel is configured to facilitate operations of demodulation module 414 at a clock rate corresponding to HRC divided by M. Utilizing a plurality of received RBDs in order to detect the transition is configured to provide robustness in the presence of bit errors associated with the received modulated HRBs, i.e., prior to and/or during equalizer adjustment. Thus, utilizing the teachings of the present disclosure, backchannel information may be reliably communicated over a link operating at the link rate prior to and/or during equalizer adjustment.

Figure 5:
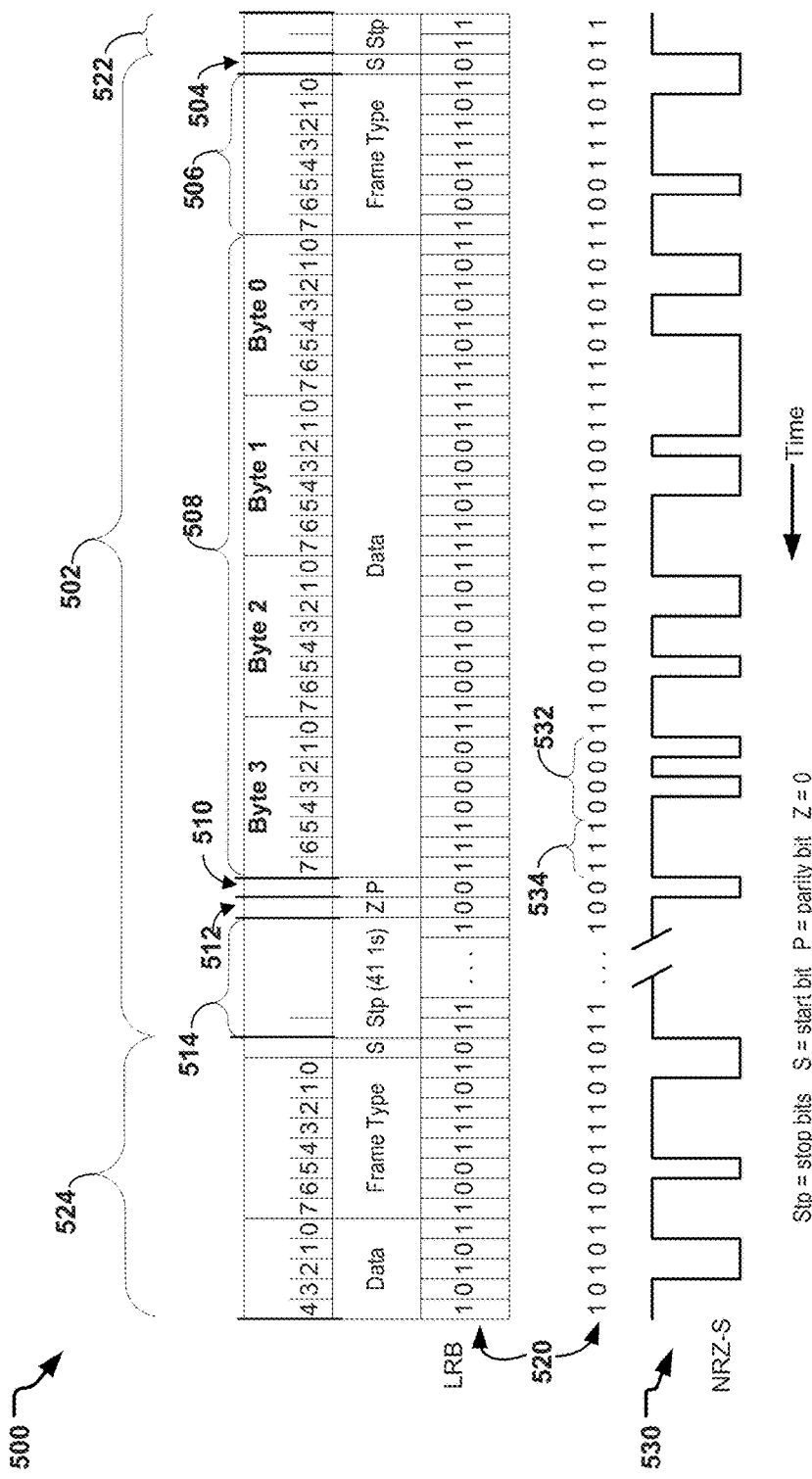
FIG. 5 illustrates an example of a backchannel bit sequence and frame structure consistent with one embodiment of the present disclosure.

FIG. 5 illustrates an example 500 of a backchannel bit sequence and frame structure consistent with one embodiment of the present disclosure. It should be noted that a time axis is oriented from right to left (i.e., time increases moving to the left along the time axis) in FIG. 5. FIG. 5 further illustrates a frame structure consistent with various embodiments of the present disclosure. Each frame 502 includes 84 bits and includes a plurality of fields. The fields include a start bit 504 (with a value corresponding to logic zero), a frame type field 506 (eight bits in this example), a data field 508 that includes four bytes in this example, a parity bit 510, a zero bit 512 and a stop bits field 514 that includes 41 logic one bits. The frame type field 506 and data field 508 are configured to carry the backchannel information.

Each bit in the frame 502 corresponds to one LRB. In this example 500, a sequence 520 of LRBs includes LRBs corresponding to frame 502, a portion of a prior frame 522 and a portion of a subsequent frame 524. NRZ-S waveform 530 illustrates the sequence 520 of LRBs encoded by, e.g., NRZ-S encoder circuitry 208, as described herein. Time interval 532 illustrates NRZ-S output for a sequence of logic zero LRBs (i.e., a transition in NRZ-S output for each bit) and time interval 534 illustrates NRZ-S output for a sequence of logic one LRBs (no transition in NRZ-S for the bits).

The frame structure is configured to facilitate acquiring frame synchronization. A failure to obtain frame synchronization may indicate that node 102 and link partner 120 of FIG. 1 are operating at different bit rates. For example, node element 102 and link partner 120 may be configured to begin a link initialization period at their respective maximum link operating rates. If their respective maximum link operating rates differ, attempts to acquire frame synchronization may fail. Operating rates may be adjusted based on frame synchronization failure information so that node 102 and link partner 120 operate at a same bit rate and frame synchronization may then be achieved. For example, if the bit rates at the two ends of the link differ, node element 102 and link partner 120 may fail to achieve bit synchronization and the backchannel module 108, 138 may consequently fail to achieve frame synchronization. Thus, this failure of frame synchronization may be used to indicate incompatible bit rates.

Once the operating bit rates have been adjusted so that the node 102 and link partner 120 are operating at the same link rate, backchannel communication may be utilized to facilitate equalizer adjustment at both node 102 and link partner 120. Since the backchannel information is configured to modulate the HR bit sequence, the HR bit sequence may be utilized for determining quality of equalization while equalizer settings are being adjusted based, at least in part, on backchannel communication.

The foregoing example embodiments are configured to provide continuous, and at least partially simultaneous, backchannel communications and link initialization communications between a node element and a link partner. Low bit rate backchannel communication may thus be accommodated using a link operating at a high bit rate (link rate) by modulation of the HRBs with LRBs that correspond to the backchannel information. Thus, mode switching may be avoided while providing robust backchannel communication during link initialization.

Figure 6:
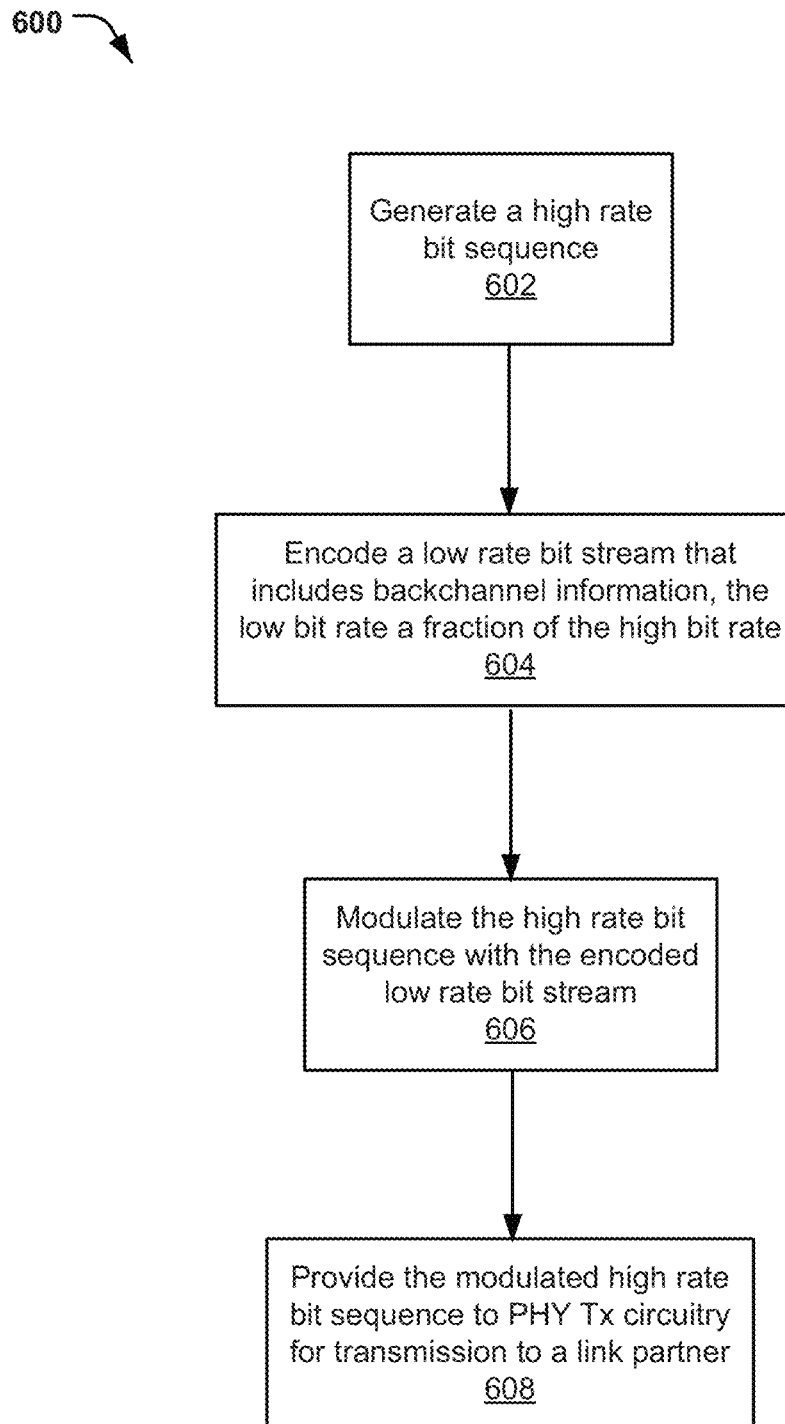
FIG. 6 is a flowchart of modulation operations according to various embodiments of the present disclosure.

FIG. 6 is a flowchart 600 of modulation operations according to various embodiments of the present disclosure. In particular, the flowchart 600 illustrates modulation operations of a modulation module during a link initialization period. Operations of this embodiment include generating a high rate bit sequence 602. Operation 604 includes encoding a low rate bit stream that includes backchannel information. The low rate may correspond to a fraction of the high rate. Operation 606 includes modulating the HR bit sequence with the encoded low rate bit stream. Operation 608 includes providing the modulated HR bit sequence to PHY Tx circuitry for transmission to a link partner.

The operations of flowchart 600 are configured to generate a HR bit sequence and to modulate the HR bit sequence with encoded the low bit rate stream that includes backchannel information thus facilitating transmission of the backchannel information at a link rate corresponding to the high bit rate.

Figure 7:
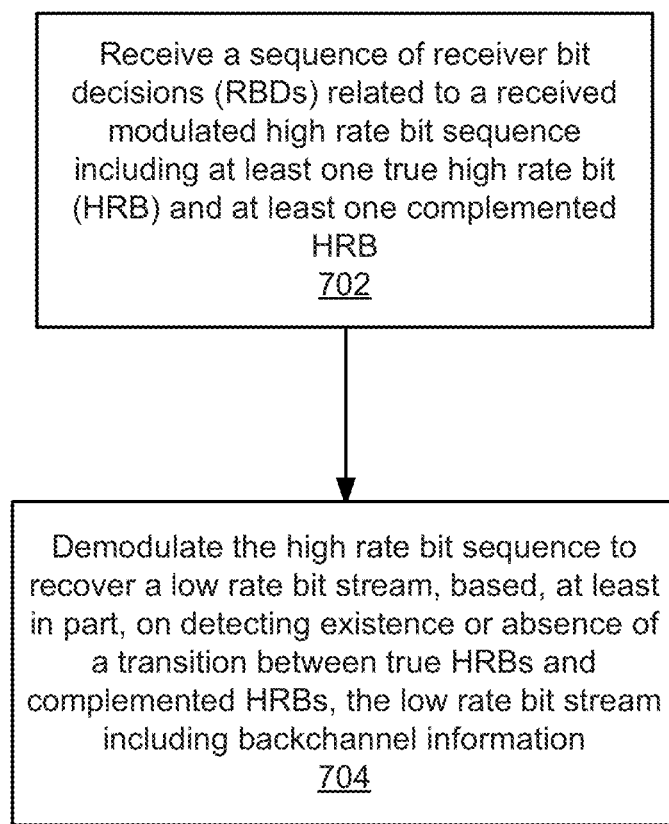
FIG. 7 is a flowchart of demodulation operations according to various embodiments of the present disclosure.

FIG. 7 is a flowchart of demodulation operations 700 according to various embodiments of the present disclosure. In particular, the flowchart 700 illustrates one example embodiment of operations of a demodulation module during a link initialization period. Operations of this embodiment include receiving a sequence of receiver bit decisions (RBDs) related to a received modulated HR bit sequence including at least one true HRB and at least one complemented HRB 702. Each HRB corresponds to and/or is related to a transmitted modulated HR bit stream bit of flowchart 600. Operations of this embodiment include demodulating the HR bit sequence to recover a low rate bit stream, based, at least in part, on detecting existence or absence of a transition between true HRBs and complemented HRBs 704. The low rate bit stream includes the backchannel information.

The operations of flowchart 700 are configured to recover transmitted LRB s that correspond to backchannel information by detecting transitions between a sequence of true HRBs and a sequence of complemented HRBs. The backchannel information may be recovered in the presence of bit errors in the receiver bit decisions, prior to and/or during equalizer setting adjustments.

Figure 8:
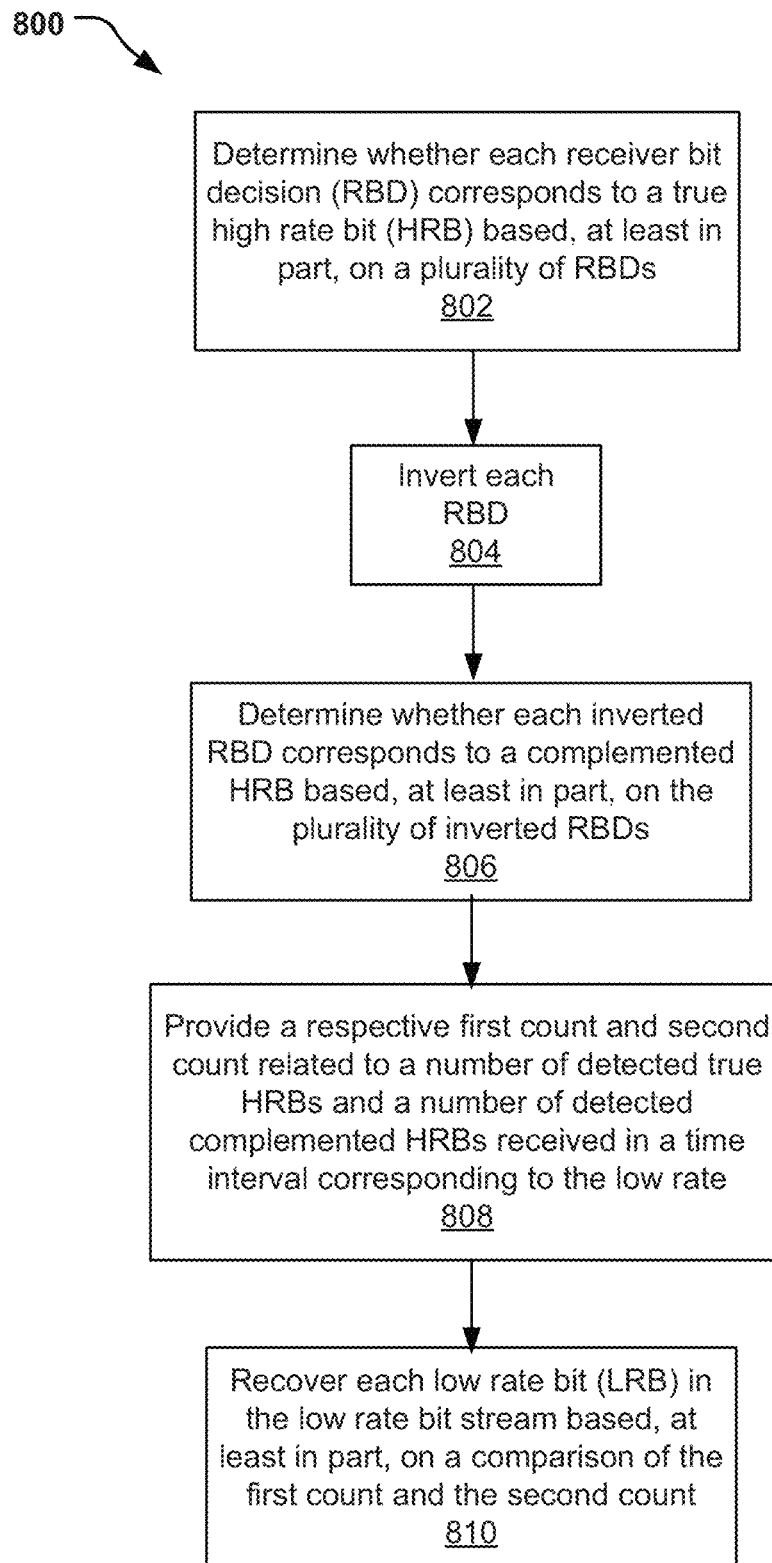
FIG. 8 is another flowchart of demodulation operations according to various embodiments of the present disclosure.

FIG. 8 is another flowchart of demodulation operations 800 according to various embodiments of the present disclosure. In particular, the flowchart 800 illustrates one example of operations 704 of FIG. 7. Operations of this embodiment include determining whether each RBD corresponds to a true HRB based, at least in part, on a plurality of RBDs 802. Operation 804 includes inverting each RBD. Operation 806 includes determining whether each inverted RBD corresponds to a complemented HRB based, at least in part, on the plurality of inverted RBDs. Operations of this embodiment include providing a first count and second count related to a number of detected true HRBs and a number of detected complemented HRBs received in a time interval corresponding to the low rate 808. Operation 810 includes recovering each low rate bit (LRB) in the low rate bit stream based, at least in part, on a comparison of the first count and the second count. A transition between relative count values (e.g., first count greater than equal to second count transitions to first count less than second count) is configured to indicate an LRB corresponding to a logic zero and the absence of a transition for a time period correspond to an LRB interval may indicate an LRB that corresponds to a logic one, as described herein.

The operations of flowchart 800 are configured to recover LRBs of the low rate bit stream that includes backchannel information in the presence of bit errors in the HR bit stream modulated by the low rate bit stream.

Figure 9:
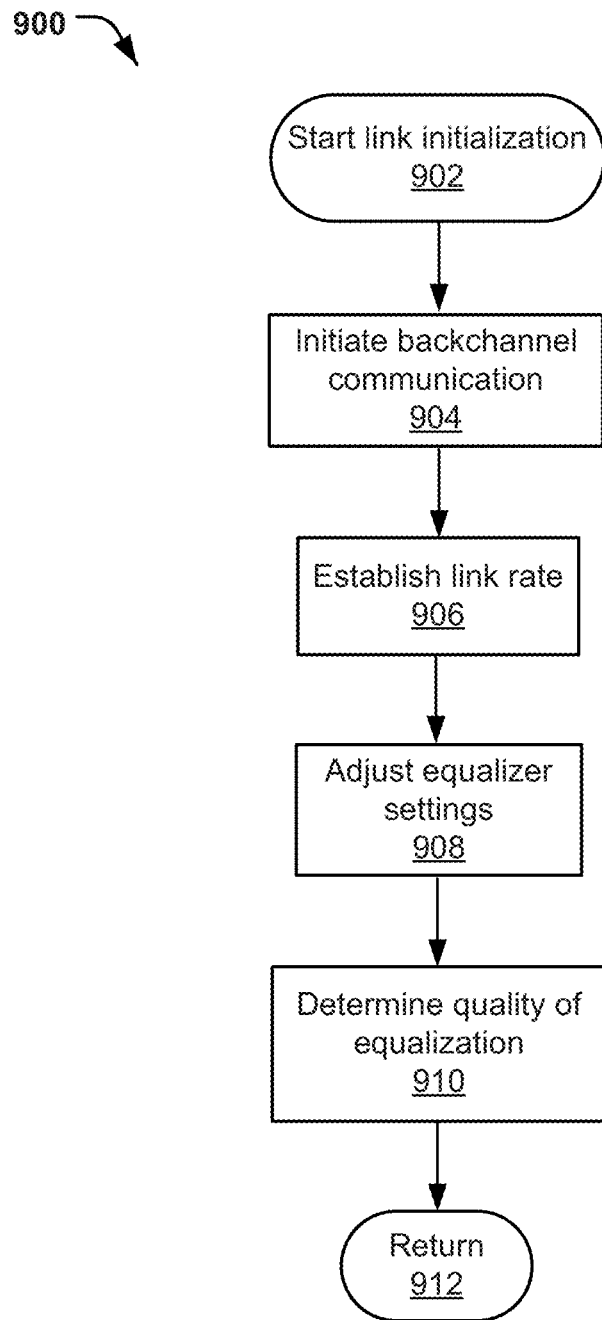
FIG. 9 is a flowchart of backchannel operations according to various embodiments of the present disclosure.

FIG. 9 is a flowchart of backchannel operations 900 according to various embodiments of the present disclosure. In particular, the flowchart 900 illustrates one example embodiment of operations of a node element and/or link partner during a link initialization period. Operations of this embodiment begin with start link initialization 902. Operations of this embodiment include initiating backchannel communication 904. For example, a backchannel module be configured to signal a modulator module to generate the HR bit sequence (at an HRC clock rate) and may provide backchannel commands and/or data (LRBs) to the modulator module for modulation onto the HR bit sequence.

Operation 906 includes establishing a link rate. The link rate corresponds to a bit rate of the link in data mode, i.e., is configured to be high rate. In some embodiments, a node element and link partner may be configured to begin the link initialization period at their respective maximum link operating rates. The node element and link partner may be configured to utilize the frame structure associated with the backchannel communication to synchronize the frames and thereby determine a correct operating rate. Mismatches in clock rates at the node element and link partner may typically result in a failure of bit synchronization between the node element and the link partner which may then result in a failure of the backchannel frame synchronization. Such a failure of frame synchronization may then be utilized by, e.g., a backchannel module, to indicate incompatible bit rates.

Operation 908 includes adjusting equalizer settings. Node element and/or link partner may be configured to adjust their respective equalizer settings once the link operating rate has been established. Backchannel communication may be conducted while the equalizer settings are being adjusted, facilitating equalization. Operation 910 includes determining quality of equalization. For example, the high rate bit stream modulated by backchannel information may be utilized to determine the quality of equalization. The bit rate of the HR bit stream corresponds to the data mode operating rate of the link, thus equalizer adjustment and quality of equalization determinations may be performed using the HR bit stream at the same time that backchannel information is being communicated. Operations of flowchart may then return 912.

The operations of flowchart 900 are configured to perform link initialization functions using low bit rate backchannel commands and/or data modulated onto a HR bit sequence. The link initialization functions may be performed with the link operating at or near its data mode link speed. Consistent with the teachings of the present disclosure, modulating the low bit rate backchannel information onto the HR bit sequence is configured to provide robust communication of the backchannel information during the link initialization period.

Determining a High Bit Rate at Link Initialization

As described above, a high data rate bit stream is used to encode a low data rate bit stream for backchannel communications. Typically, the node 102 and link partner support multiple high data rates (link speeds) and multiple equalization settings, and typically, the node 102 and link partner 120 have at least one link speed in common that would support high bit rate communications. However, at link initialization, the node 102 and link partner 120 are typically not aware of the each other's link speed capabilities or the optimum equalization setting for a given link speed. To enable the node 102 and the link partner 120 to lock on to a common link speed, the node 102 is configured to cycle through a plurality of link speeds and a plurality of transmitter equalization presets. The link partner 120 is similarly configured to cycle through link speeds and equalization presets. The node 102 and/or link partner 120 is configured to determine if a given link speed and equalization preset value is supported. Link initialization, as described herein may occur after a link polling state is initiated and a link debounce state is completed, so that the link is ready to transmit and receive data streams at a high bit rate.

Accordingly, and referring again to FIG. 1, the network controller 104 may also include a link speed cycling module 156 and an equalization presets cycling module 158. Upon initialization, the Tx circuitry 116 is configured to begin transmitting frames to the Rx circuitry 146 of the link partner 120 at a maximum available link speed (high bit rate) for the node 102. The equalization presets cycling module 158 is configured to cycle through at least one equalization preset setting at the maximum link speed. The link speed cycling module 156 is configured to enable the Rx circuitry 118 to cycle through available link speeds when receiving frames from the Tx circuitry 148 of the link partner 120 upon initialization of the link 126. The link partner 120 may include link speed cycling module 160 configured to operate in a similar manner as module 156 and equalization presets cycling module 162 configured to operate in a similar manner as module 158.

Upon initialization of the system 100, the link speed cycling module 156 is configured to initiate the transmitter (Tx circuitry 116) to transmit data frames (e.g., announce frames, described below), for example, at the highest data rate associated with node 102. The link speed cycling module 156 is also configured to initiate the receiver (Rx circuitry 118) into a listening state to "listen" for received frames (e.g., announce frames and preferred preset frames, described below) from the transmitter 148 of the link partner 120. The listening state may be enabled to receive transmitted data frames at the maximum data rate that is supported by receiver 118. When a link speed is selected by the link speed cycling module 156, the equalization presets cycling module 158 is configured to cycle through at least one equalizer preset and apply the at least one equalizer preset to the transmitter 118. The link speed cycling module 156 is further configured to dwell on a selected link speed for a transmitter dwell time period. The transmitter dwell time period may be based on, for example, the amount of time that the link partner 120 takes to recognize a given link speed, the amount of time needed to cycle through the number of equalizer presets associated with module 158, the amount of time that the receiver 146 of the link partner 120 takes to "lock on" to a data stream at a the selected link speed and the selected equalizer setting, etc. The amount of time needed for the receiver 146 of the link partner 120 to "lock on" to a transmitted data stream may be based on, for example, clock data recover (CDR) time periods associated with the link partner 120, PLL circuitry calibration timing requirements associated with the link partner, etc. The link speed cycling module 156 is generally configured to dwell on a selected data rate long enough to permit the equalization presets module 158 to cycle through the number of defined equalizer settings presets at least once, and typically several times, thus providing sufficient time and overlap to enable the receiver 146 to "lock on" to a data stream.

On the receiver side, upon initialization, the link partner 120 is configured to place the receiver circuitry 146 in a listening state to enable the receiver to receive transmitted data frames from the transmit circuitry 116 of the node 102. The listening state may be enabled to receive transmitted data frames at the maximum data rate that is supported by the receiver 146. The receiver 146 is configured to dwell at the maximum data rate for a receiver dwell time period that is based on, at least in part, the transmitter dwell time period (of transmitter 116), a buffer time period to allow for overlap, etc. In general, the receiver dwell time period of the receiver 146 is greater than the transmitter dwell time of the transmitter 116, for example, as given by:

Rx dwell time=(number of equalizer preset values+1)*Tx dwell time+PLL circuitry calibration time; where the +1 value provides an overlap of equalization setting values to ensure that the receiver evaluates all of the transmitter equalization presets in a given high bit rate window.

If the receiver 146 is unable to lock on to a transmitted data stream from the node 102, the link partner 120 is configured to shift the listening speed of the Rx circuitry 146, e.g., to the next fastest link speed supported by the link partner 120. If the receiver circuitry 146 is able to "lock on" to a received data stream, the transmitter 148 of the link partner 120 is configured to transmit acknowledgement data frames to the node 102 indicating that the receiver 146 is operational at the transmitted data rate and at the selected equalization setting. The frames transmitted and received by the node 102 and link partner 120 may be encoded/decoded and modulated/demodulated using the modulation schemes (e.g., PRBS modulation demodulation) described above with reference to FIGS. 1-9.

In some embodiments, the link 126 is bi-directional, and thus, when the receiver 146 of the link partner 120 "locks on" to a given data rate and equalization setting, the transmitted acknowledgement frames may not be "locked on" by the node 102, meaning that the link between Tx circuitry 148 and Rx circuitry 118 is not operational at the selected speed and equalization setting (even though the link between Tx circuitry 116 and Rx circuitry 146 is operational at the selected speed and equalization setting). In this case, link speed cycling module 160 and equalizer presets module 162 may begin cycle through link speeds and equalization settings while transmitting announce frames from transmitter 148 to receiver 118 in an attempt to establish an operational link between the transmitter 148 and receiver 118. Thus, the link speed and/or equalization setting between node 102 and link partner 120 may be asymmetric in some embodiments.

In some embodiments, once an acceptable link speed and equalization setting is found that enables high speed communication between the node 102 and link partner 120, the initialization process may terminate and the system may be placed in another operational state, e.g., backchannel communications state as described above. In other embodiments, the node 102 and link partner 120 may cycle through all available link speeds and equalization presets and, if multiple acceptable parameters are determined, the node 102 and/or link partner 120 may select from among the group of parameters to determine an "optimal" link speed and equalization setting based on, for example, bit error rate (BER) amplitude evaluation (e.g., SERDES) of the received signal pulses, etc. In general, if no acceptable link speed/equalization preset is determined, the system may terminate the initialization state and move to the next operational state.

The equalization presets selected by the equalization preset module 158 and/or module 162 may include, for example, a set of equalization settings or parameters, the number and type of which may be established a priori between the node 102 and the link partner 120. In some embodiments, the equalizations presets may range from "low" equalization to "moderate" equalization to "high" equalization, since the loss on the link 126 may be unknown at initialization. In this context, "low", "moderate" and "high" generally refer to the amount of compensation for link characteristics (e.g., frequency response, noise, etc.) that contribute to bit errors to reduce the bit error rate for the link. In one example embodiment, the equalization presets may include a "low" equalization setting, a "moderate" equalization setting, a "high" equalization setting and a predefined equalization setting. The predefined equalization setting may include, for example, an equalization setting that is based on a priori knowledge of the channel quality characteristics. In some embodiments, the equalization presets may be used to provide an estimate of an optimal equalizer setting such that the equalizer setting may be adjusted (e.g., fine-tuned) during other operational states (e.g., equalizer settings during backchannel communications, described above).

Figure 10A:
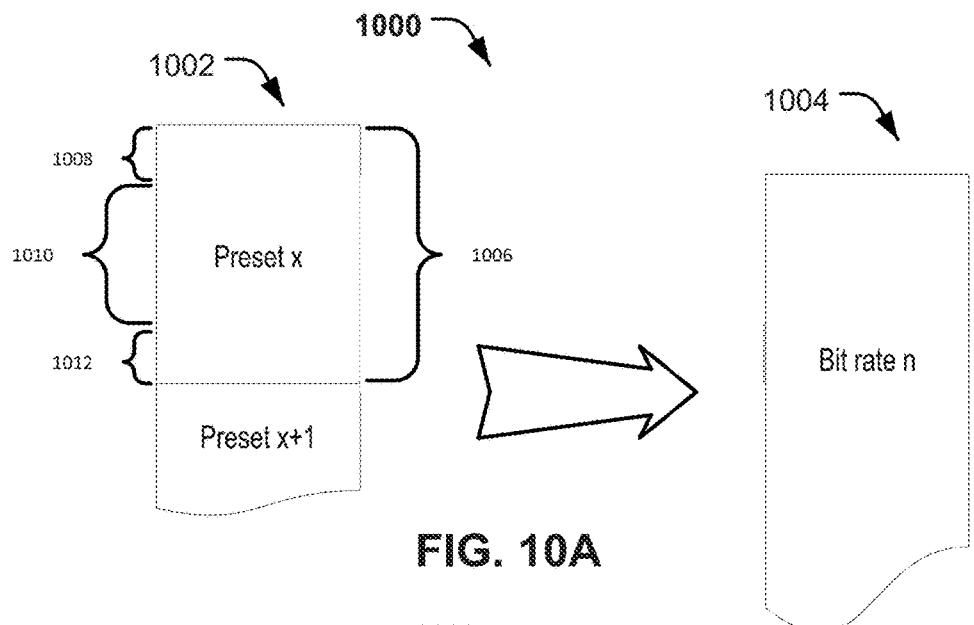
FIG. 10A illustrates a simplified transmitter/receiver system depicting a transmitter dwell time to determine a high data rate and equalization setting at link initialization between a transmitter and receiver according to various embodiments of the present disclosure.

FIG. 10A illustrates a simplified transmitter/receiver system 1000 depicting a transmitter dwell time to determine a high data rate and equalization setting at link initialization between a transmitter and receiver according to various embodiments of the present disclosure. In this example, a transmitter 1002 is configured to cycle equalization presets (Preset x, Preset x+1, . . . ) while transmitting to a receiver 1004 at a highest data rate (link speed) supported by the transmitter 1002. The receiver 1004 is configured to "listen" for a received data stream at a highest data rate (link speed) supported by the receiver 1004 (e.g., bit rate n). The transmitter 1002 is configured to dwell at a given equalization setting preset (e.g., Preset x) for a time period 1006 that is sufficient to enable the receiver to "lock on" to the data stream transmitted using Preset x (if the receiver 1004 is so capable). The transmitter dwell time period 1006 may include a transmitter set-up time period 1008 to allow the transmitter 1004 to initialize an announce state, a channel lock time period 1010 to allow for the receiver 1004 to "lock on" to the data stream at the selected bit rate (link speed) and equalization setting (Preset x), and a validation time period 1012 to allow the receiver 1004 to validate a received data stream. In one example embodiment, the set-up time period 1008 may be on the order of 0.1 ms., the channel lock time period 1010 may be on the order of 16 ms. (assuming four CDRs associated with the channel), and the validation time period 1012 may be on the order of 3.9 ms. If receiver 1004 does not lock on during this time period 1006, the transmitter 1002 is configured to cycle to the next equalization setting Preset x+1, while the receiver 1004 continues to dwell at the link speed (bit rate n).

Figure 10B:
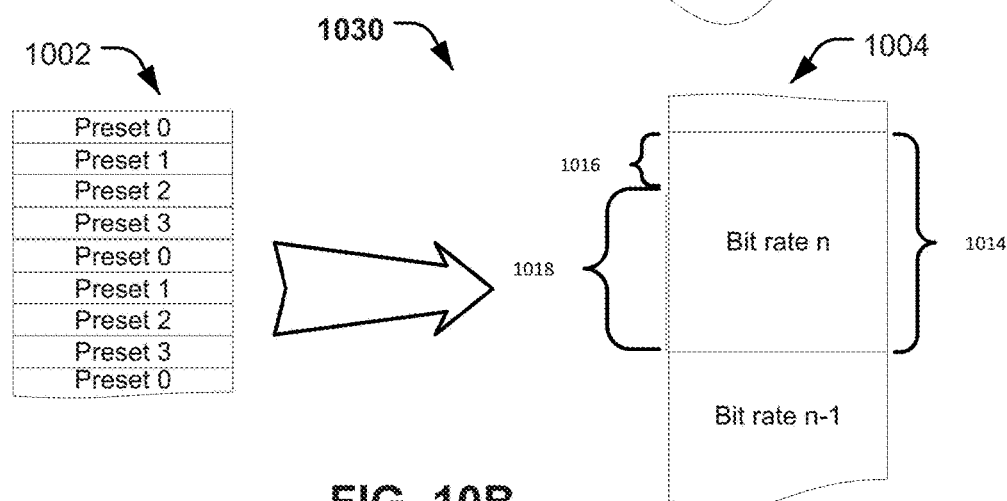
FIG. 10B illustrates another simplified transmitter/receiver system depicting a receiver dwell time to determine a high data rate and equalization setting at link initialization between a transmitter and receiver according to various embodiments of the present disclosure.

FIG. 10B illustrates another simplified transmitter/receiver system 1030 depicting a receiver dwell time to determine a high data rate and equalization setting at link initialization between a transmitter and receiver according to various embodiments of the present disclosure. In this example, the transmitter 1002 is configured to cycle through four equalization presets (Preset 0, Preset 1, Preset 2 and Preset 3) while transmitting to the receiver 1004 at a highest data rate (link speed) supported by the transmitter 1002. The receiver 1004 is configured to "listen" for a received data stream at a highest data rate (link speed) supported by the receiver 1004 (e.g., bit rate n). The receiver 1004 is also configured to dwell for a time period 1014 that is based on, at least in part, the dwell time of each equalizer preset value (1006) of the transmitter 1002 so that an overlap exists. The receiver dwell time period 1014 includes a calibration time period 1016 and an overlap period 1018. The overlap ensures that the receiver 1004 will have an adequate opportunity to "lock on" to the received data stream at each equalizer preset setting while the transmitter 1002 is transmitting at the highest data rate (link speed) supported by the transmitter 1002. In one example embodiment, the calibration time period 1016 may be on the order of 20 ms, and the overlap time period 1018 may be on the order of 100 ms. If receiver does not lock during this time period 1014, the receiver 1004 is configured to move to the next highest data rate supported by the receiver 1004 (e.g., bit rate n−1).

Figure 10C:
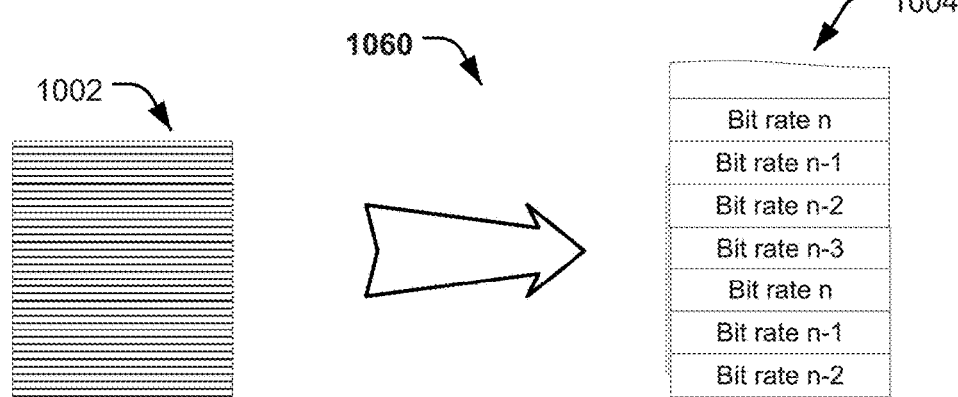
FIG. 10C illustrates another simplified transmitter/receiver system depicting data rate and equalization preset setting cycling to determine a high data rate and equalization setting at link initialization between the transmitter and the receiver according to one embodiment of the present disclosure.

FIG. 10C illustrates another simplified transmitter/receiver system 1060 depicting data rate and equalization preset setting cycling to determine a high data rate and equalization setting at link initialization between the transmitter 1002 and the receiver 1004 according to one embodiment of the present disclosure. In this example, the transmitter 1002 and receiver 1004 are depicted cycling through a plurality of link speeds (bit rate n, . . . , bit rate n−2) and, for each link speed, cycling through a plurality of equalization setting presets (illustrated as the plurality of horizontal lines associated with the transmitter 1002 cycling periods.

Figures 11A, 11B, 11C:
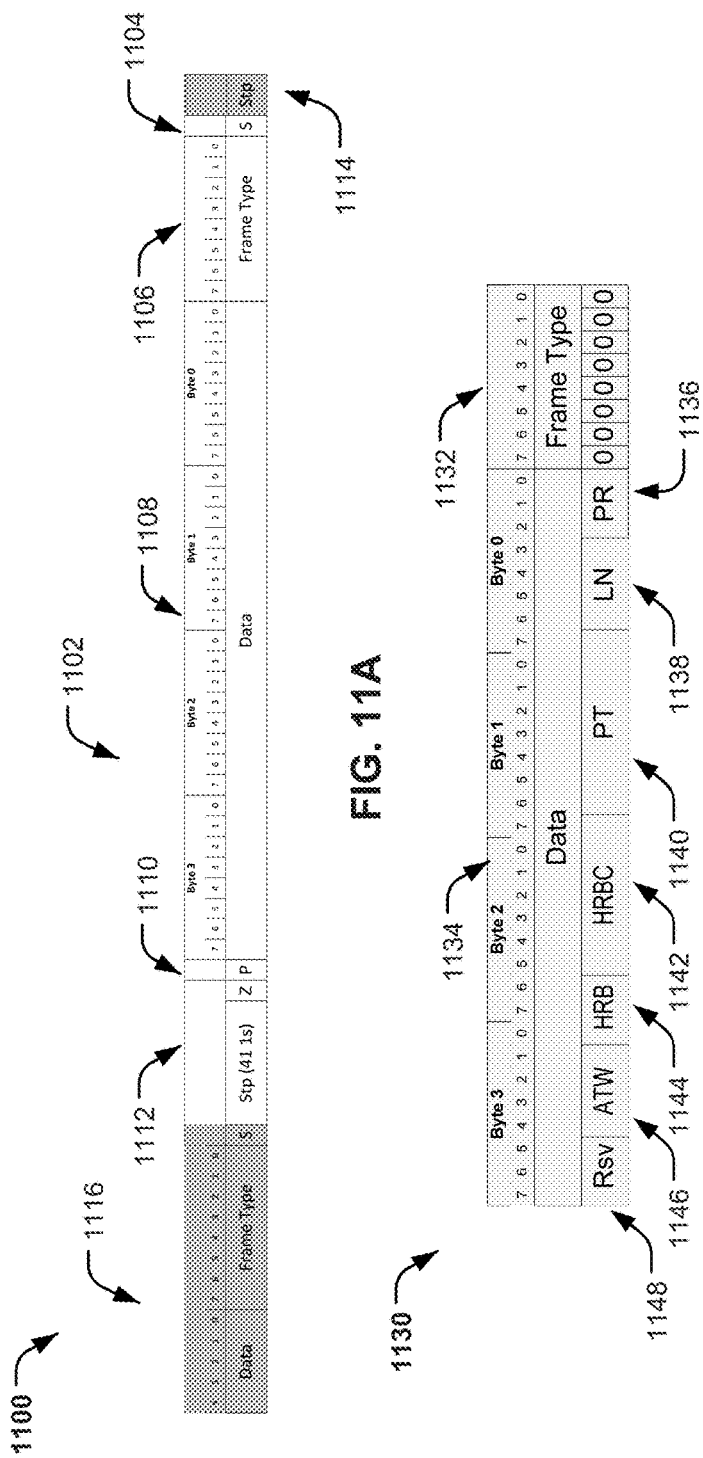
FIG. 11A illustrates a high rate data stream of a transmitter according to various embodiments of the present disclosure.
FIG. 11B illustrates an announce frame structure according to one embodiment of the present disclosure.
FIG. 11C illustrates a preferred preset frame structure according to one embodiment of the present disclosure.

FIG. 11A illustrates a low rate data stream 1100 of a transmitter according to various embodiments of the present disclosure. The data stream 1102 of FIG. 11A illustrates the data stream of the transmitter (Tx circuitry) that is modulated (using the PRBS modulation techniques described above) using the high data rate (link speed) bit speed as determined by the techniques described herein. The data stream 1102 represents a frame structure that generally includes a start bit 1104, a frame type field 1106 (e.g., one byte), a data field 1108 (e.g. 4 bytes), a parity bit 1110, and an end-of-frame field 1112 (e.g., 41 bits set to a logic 1 and a forced bit set to logic zero) to mark the frame boundary. The frame structure is preceded and followed by frame structures 1014 and 1016, respectively. The start bit 1105 and the end-of-frame field 1112 may be used by the receiver circuitry to enable frame synchronization, etc. The frame type field 1106 and the data field 1108 may be include information associated with the transmitter announce frame and/or the receiver preferred preset frame, as will be described below.

FIG. 11B illustrates an announce frame structure 1130 according to one embodiment of the present disclosure. The announce frame 1130 is transmitted by the transmitter during initialization, and generally includes information of the current link speed and equalizer preset settings and/or capabilities of the transmitter node. The announce frame includes a frame type field 1132 and a data field 1134. The frame type field 1132 may be used to identify the type of data present in the data field(s), so that the receiver may interpret the data field(s) properly. The frame type field 1132 and the data field 1134, in this example, each include a one byte field and a four byte field, respectively. The data field 1134 includes a PR field 1136 (e.g., 3 bits) that may be set to indicate the current active transmitter equalization preset setting. The data field 1134 also includes a LN field 1138 (e.g., 4 bits) that may be set to indicate the lane number of a port associated with the transmitter. The data field 1134 also includes a PT field 1140 (e.g., 8 bits) that may be set to indicate a logical port number associated with a transmitter port. The data field 1134 also includes an HRBC field 1142 (e.g., 7 bits) that may be set to indicate a plurality of link speeds that may be supported by the transmitter. The data field 1134 also includes an HRB field 1144 (e.g., 3 bits) that may be set to point to the HRBC field 1142 to indicate the current selected high rate link speed. The data field 1134 also includes an ATW field 1146 (e.g., 4 bits) that may be set to indicate a width (number of lanes) of the transmitter port. The data field 1134 also includes a reserved field 1148 (e.g., 3 bits) that may be set to indicate additional capabilities of the transmitter node. The announce frame 1130 transmitted by the node 102 may be modulated into the data stream frame 1100 of FIG. 11A using the modulation schemes (e.g., PRBS modulation/demodulation) described above with reference to FIGS. 1-9. For example, the frame type field 1132 and the data field 1134 may represent low rate information that is modulated, using the selected high data rate, onto the data stream 1100 of FIG. 11A. Of course, at the receiving end, the data stream may be demodulated using the demodulation schemes (e.g., PRBS modulation/demodulation) described above with reference to FIGS. 1-9, to recover the frame type field 1132 and the data field 1134.

FIG. 11C illustrates a preferred preset frame structure 1160 according to one embodiment of the present disclosure. The preferred preset frame 1130 is transmitted by the receiving node in response to a lock of a transmitted announce frame by a receiver, and generally includes. The preferred preset frame 1160 includes a frame type field 1162 and a data field 1164. The frame type field 1162 and the data field 1164, in this example, each include a one byte field and a four byte field, respectively. The data field 1164 includes a plurality of port fields 1166, e.g., PP0, PP1, . . . , PP7. The preferred preset frame 1160 transmitted by the receiving node may be modulated into the data stream frame 1100 of FIG. 11A using the modulation schemes (e.g., PRBS modulation/demodulation) described above with reference to FIGS. 1-9. For example, the frame type field 1162 and the data field 1164 may represent low rate information that is modulated, using the selected high data rate, onto the data stream 1100 of FIG. 11A. Of course, at the receiving end, the data stream may be demodulated using the demodulation schemes (e.g., PRBS modulation/demodulation) described above with reference to FIGS. 1-9, to recover the frame type field 1162 and the data field 1164.

Figure 12:
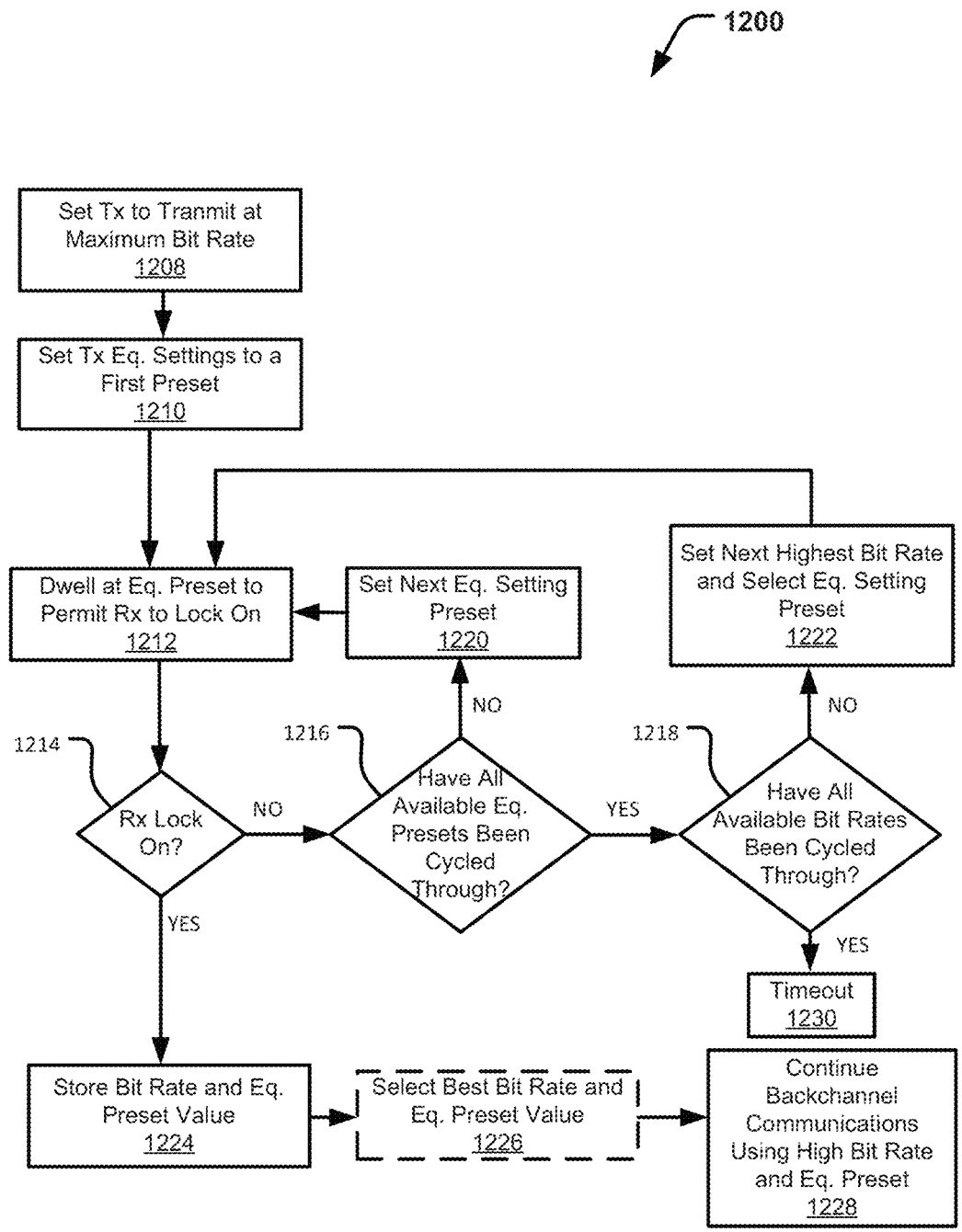
FIG. 12 is a flowchart of link initialization operations according to various embodiments of the present disclosure.

FIG. 12 is a flowchart of link initialization operations 1200 according to various embodiments of the present disclosure. Operations include setting a transmitter to transmit a data stream at a maximum high bit rate (link speed) 1208. The link speed corresponds to a bit rate of the link in data mode, i.e., is configured to be high rate. Operations may also include setting transmitter equalization settings to a first preset value 1210. Operations may also include dwelling, by the transmitter, at the selected equalization preset value to enable a receiver to lock on to the transmitted data stream 1212. Operations may also include determining if a receiver, in communication with the transmitter, has locked on to the transmitted data stream 1214. If the receiver has not locked on at the current bit rate and equalization preset settings, operations may also include determining if all available equalization presets have been cycled through 1216, and if not, operations may also include selecting a next equalization preset 1220 and dwelling at the next equalization preset 1212. If all of the available equalization presets have been cycled through 1216, operations may include determining if all available high bit rates have been cycled through 1218. If not, operations may include setting the transmitter to transmit at the next highest (fastest) bite rate and selecting an equalization preset 1222, dwelling at the selected equalization preset 1212. If all available high bit rates have been cycled through (1218) and the receiver has not obtained a lock at any high bit rate or equalization setting, operations may include timing out of initialization operations 1230 and, in some embodiments, moving to a different operational state.

If the receiver locks on to the data stream (1214), operations may include storing the bit rate and equalization preset values that enabled a lock 1124. In other embodiments, the transmitter and receiver may cycle through all available link speeds and equalization presets and, if multiple acceptable parameters are determined, operations may also include selecting an "optimal" bit rate and equalization setting from among the group of parameters 1126. Once a high bit rate and equalization preset have been determined that enable communication between the transmitter and receiver, operations may also including shifting to a different operational state, e.g., backchannel communications, using the usable high bit rate and equalization preset 1128.

While the flowcharts of FIGS. 6, 7, 8, 9 and 12 illustrate operations according to various embodiments, it is to be understood that not all of the operations depicted in FIGS. 6, 7, 8, 9 and/or 12 are necessary for other embodiments. In addition, it is fully contemplated herein that in other embodiments of the present disclosure, the operations depicted in FIGS. 6, 7, 8, 9 and/or 12, and/or other operations described herein may be combined in a manner not specifically shown in any of the drawings, and such embodiments may include less or more operations than are illustrated in FIGS. 6, 7, 8, 9 and/or 12. Thus, claims directed to features and/or operations that are not exactly shown in one drawing are deemed within the scope and content of the present disclosure.

The foregoing provides example system architectures and methodologies, however, modifications to the present disclosure are possible. For example, node 102 and/or link partner 120 may also include a host processor, chipset circuitry and system memory. The host processor may include one or more processor cores and may be configured to execute system software. System software may include, for example, operating system code (e.g., OS kernel code) and local area network (LAN) driver code. LAN driver code may be configured to control, at least in part, the operation of the network controller 104, 134. System memory may include I/O memory buffers configured to store one or more data packets that are to be transmitted by, or received by, network controller 104, 134. Chipset circuitry may generally include "North Bridge" circuitry (not shown) to control communication between the processor, network controller 104, 134 and system memory.

Node 102 and/or link partner 120 may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network controller 104. The TCP offload engine circuitry may be configured to provide, for example, packet transport, packet segmentation, packet reassembly, error checking, transmission acknowledgements, transmission retries, etc., without the need for host CPU and/or software involvement.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage devices having stored thereon, individually or in combination, instructions that when executed by one or more processors perform the methods. The processor may include, for example, a processing unit and/or programmable circuitry in the network controller 104, 134 and/or other processing unit or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language may be used to specify circuitry and/or logic implementation for the various modules and/or circuitry described herein. For example, in one embodiment the hardware description language may comply or be compatible with a very high speed integrated circuits (VHSIC) hardware description language (VHDL) that may enable semiconductor fabrication of one or more circuits and/or modules described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description language standards.

"Circuitry" or "circuit", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

Network systems (and methods), consistent with the teachings of the present disclosure are configured to provide continuous backchannel communications between a node element and a link partner during link initialization. In various embodiments, low rate data and commands associated with backchannel communications may be modulated onto high rate bit stream utilized, e.g., for adjusting equalizer settings. The low bit rate of the backchannel information is configured to provide robust communication of the backchannel information at the link rate, during link initialization before and/or during equalizer settings adjustment. Robust communication of backchannel information in the presence of errors in the received modulated HR bit sequence, e.g., prior to equalization, may thus be provided and mode shifting during backchannel communications may be avoided.

The systems and methods may be configured to accommodate polarity inversions resulting from cross-wiring of true and complement signals in a printed circuit board. In some embodiments, the system and method may be configured to accommodate mismatches in clock rates at the two ends of the link. In some embodiments, determining the quality of equalization may be facilitated by the simultaneous transmission of backchannel information with the high rate bit stream.

Accordingly, the present disclosure provides an example network controller. The example network controller includes physical interface (PHY) circuitry comprising transmitter circuitry configured to transmit data frames to a link partner in communication with the transmit circuitry over a channel link. The network controller also includes a link speed cycling module configured to, upon initialization of the PHY circuitry, cause the transmitter circuitry to transmit data frames to the link partner using at least one high rate link speed. The network controller also includes an equalization presets cycling module configured to apply at least one equalization preset setting to the transmitter circuitry while the transmitter circuitry is transmitting the data frames to the link partner. The link speed module is further configured to cause the transmitter circuitry to dwell, for a transmitter dwell time period, for the at least one equalization preset setting at the at least one high rate link speed; wherein the transmitter dwell time period is sufficient to allow the link partner to lock on to the transmitted data frames.

The present disclosure also provides an example method. The example method includes setting transmitter circuitry, upon initialization of the transmitter circuitry, to transmit data frames to a link partner using at least one high rate link speed. The method also includes applying at least one equalization preset setting to the transmitter circuitry while the transmitter circuitry is transmitting the data frames to the link partner. The method also includes dwelling, for a transmitter dwell time period by the transmitter circuitry, for the at least one equalization preset setting at the at least one high rate link speed, for a time period sufficient to allow the link partner to lock on to the transmitted data frames.

The present disclosure also provides an example system that includes one or more storage devices having stored thereon, individually or in combination, instructions that when executed by one or more processors result in the following operations including: set transmitter circuitry, upon initialization of the transmitter circuitry, to transmit data frames to a link partner using at least one high rate link speed; apply at least one equalization preset setting to the transmitter circuitry while the transmitter circuitry is transmitting the data frames to the link partner; and dwell, for a transmitter dwell time period by the transmitter circuitry, for the at least one equalization preset setting at the at least one high rate link speed, for a time period sufficient to allow the link partner to lock on to the transmitted data frames.

The present disclosure also provides an example node. The example node includes a processor; a memory; and a network controller. The network controller includes physical interface (PHY) circuitry comprising transmitter circuitry configured to transmit data frames to a link partner in communication with the transmit circuitry over a channel link; a link speed cycling module configured to, upon initialization of the PHY circuitry, cause the transmitter circuitry to transmit data frames to the link partner using at least one high rate link speed; and an equalization presets module configured to apply at least one equalization preset setting to the transmitter circuitry while the transmitter circuitry is transmitting the data frames to the link partner. The link speed module is further configured to cause the transmitter circuitry to dwell, for a transmitter dwell time period, for the at least one equalization preset setting at the at least one high rate link speed; wherein the transmitter dwell time period is sufficient to allow the link partner to lock on to the transmitted data frames.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network controller, comprising:
    modulation circuitry to determine a first modulated high rate (HR) bit sequence, the first modulated HR bit sequence including a first low rate (LR) bit stream modulated onto a first HR bit sequence and the first LR bit stream including at least first backchannel information;
    physical interface (PHY) circuitry including transmitter circuitry to transmit the first modulated HR bit sequence to a link partner over a channel link;
    link speed cycling circuitry to, upon initialization of the PHY circuitry, cause the transmitter circuitry to transmit the first modulated HR bit sequence to the link partner over the channel link using at least one high rate link speed; and
    equalization presets cycling circuitry to apply at least one equalization preset setting to the transmitter circuitry based in part on the first modulated HR bit sequence while the transmitter circuitry is transmitting the first modulated HR bit sequence to the link partner.

2. The network controller of claim 1, wherein the link speed cycling circuitry is further to cause the transmitter circuitry to dwell, for a transmitter dwell time period, for the at least one equalization preset setting at the at least one high rate link speed; wherein the transmitter dwell time period is sufficient to allow the link partner to lock on to the transmitted first modulated HR bit sequence.

3. The network controller of claim 1, further comprising demodulation circuitry, wherein:
    the PHY circuitry further includes receiver circuitry;
    the link speed cycling circuitry is further to, upon initialization of the PHY circuitry, cause the receiver circuitry to receive a second modulated HR bit sequence from the link partner over the channel link using at least a second high rate link speed; and
    the demodulation circuitry is to demodulate the second modulated HR bit sequence to recover a second LR bit stream, the second LR bit stream including second backchannel information.

4. The network controller of claim 3, wherein the demodulation circuitry is to demodulate the second HR bit sequence to recover the second LR bit stream based, at least in part, on detecting an existence of or an absence of a transition between a true HR bit sequence and a complementary HR bit sequence.

5. The network controller of claim 3, wherein the link speed cycling circuitry is further to cause the receiver circuitry to cycle through a plurality of link speeds.

6. A method, comprising:
    determining, via modulation circuitry, a first modulated high rate (HR) bit sequence, the first modulated HR bit sequence including a first low rate (LR) bit stream modulated onto a first HR bit sequence and the first LR bit stream including at least first backchannel information;
    transmitting, via transmitter circuitry, the first modulated HR bit sequence to a link partner over a channel link using at least one high rate link speed; and
    applying, via equalization presets cycling circuitry, at least one equalization preset setting to the transmitter circuitry based in part on the first modulated HR bit sequence while the transmitter circuitry is transmitting the first modulated HR bit sequence to the link partner.

7. The method of claim 6, further comprising dwelling, by the transmitter circuitry, for the at least one equalization preset setting at the at least one high rate link speed; wherein the transmitter dwell time period is sufficient to allow the link partner to lock on to the transmitted first modulated HR bit sequence.

8. The method of claim 6, further comprising:
    receiving, via receiver circuitry, a second modulated HR bit sequence from the link partner over the channel link using at least a second high rate link speed; and
    demodulating, via demodulation circuitry, the second modulated HR bit sequence to recover a second LR bit stream, the second LR bit stream including second backchannel information.

9. The method of claim 8, wherein demodulating, via demodulation circuitry, the second modulated HR bit sequence to recover a second LR bit stream comprises:
    demodulating, via demodulation circuitry, the second HR bit sequence to recover the second LR bit stream based, at least in part, on detecting an existence of or an absence of a transition between a true HR bit sequence and a complementary HR bit sequence.

10. The method of claim 8, further comprising cycling, by the transmitter circuitry, a plurality of link speeds.

11. At least one non-transitory computer-readable storage device having instructions stored thereon which, when executed by at least one processor, result in operations comprising:
    determine, via modulation circuitry, a first modulated high rate (HR) bit sequence, the first modulated HR bit sequence including a first low rate (LR) bit stream modulated onto a first HR bit sequence and the first LR bit stream including at least first backchannel information;
    transmit, via transmitter circuitry, the first modulated HR bit sequence to a link partner over a channel link using at least one high rate link speed; and
    apply, via equalization presets cycling circuitry, at least one equalization preset setting to the transmitter circuitry based in part on the first modulated HR bit sequence while the transmitter circuitry is transmitting the first modulated HR bit sequence to the link partner.

12. The at least one non-transitory computer-readable storage device of claim 11, having additional instructions stored thereon which when executed by the at least one processor result in additional operations comprising:
    dwell, by the transmitter circuitry, for the at least one equalization preset setting at the at least one high rate link speed; wherein the transmitter dwell time period is sufficient to allow the link partner to lock on to the transmitted first modulated HR bit sequence.

13. The at least one non-transitory computer-readable storage device of claim 11, having additional instructions stored thereon which when executed by the at least one processor result in additional operations comprising:

receive, via receiver circuitry, a second modulated HR bit sequence from the link partner over the channel link using at least a second high rate link speed; and demodulate, via demodulation circuitry, the second modulated HR bit sequence to recover a second LR bit stream, the second LR bit stream including second backchannel information.

14. The at least one non-transitory computer-readable storage device of claim 13, wherein the instructions which when executed by the at least one processor result in the operations demodulate, via demodulation circuitry, the second modulated HR bit sequence to recover a second LR bit stream, when executed by the at least one processor, result in additional operations comprising:

demodulate, via demodulation circuitry, the second HR bit sequence to recover the second LR bit stream based, at least in part, on detecting an existence of or an absence of a transition between a true HR bit sequence and a complementary HR bit sequence.

15. The at least one non-transitory computer-readable storage device of claim 13, having additional instructions stored thereon which when executed by the at least one processor result in additional operations comprising:

cycle, via the transmitter circuitry, a plurality of link speeds.

* * * * *